US012782491B2

(12) United States Patent
Wang et al.

(10) Patent No.: US 12,782,491 B2
(45) Date of Patent: Nov. 3, 2026

(54) LOCALIZATION METHOD, APPARATUS, AND SYSTEM

(71) Applicant: HUAWEI TECHNOLOGIES CO., LTD., Shenzhen (CN)

(72) Inventors: Wei Wang, Singapore (SG); Zhan Yu, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 18/606,686

(22) Filed: Mar. 15, 2024

(65) Prior Publication Data

US 2024/0230827 A1 Jul. 11, 2024

Related U.S. Application Data

(63) Continuation of application No. PCT/CN2021/119469, filed on Sep. 18, 2021.

(51) Int. Cl.
*G01S 5/02* (2010.01)

(52) U.S. Cl.
CPC .................................. *G01S 5/0246* (2020.05)

(58) Field of Classification Search
CPC ......... H04W 72/1242; H04W 72/1268; H04W 72/1289; H04W 72/12; H04W 72/10; H04W 52/08; H04W 52/146; H04W 52/325; H04W 52/362; H04W 52/367; H04W 52/54; H04W 72/044; H04W 72/23; H04W 52/32; H04W 72/04; H04L 5/00; H04L 1/1861; H04L 1/1864;
(Continued)

(56) References Cited

U.S. PATENT DOCUMENTS 6,243,587 B1 * 6/2001 Dent ..................... H04W 64/00 455/503
7,050,479 B1 * 5/2006 Kim ..................... H04B 1/7143 375/E1.035
(Continued)

FOREIGN PATENT DOCUMENTS

CN 101435867 A 5/2009
CN 101782643 A 7/2010
(Continued)

OTHER PUBLICATIONS

Extended European Search Report in European Appln. No. 21957190.8, mailed on Sep. 12, 2024, 9 pages.
(Continued)

*Primary Examiner* — Nathan S Taylor
(74) *Attorney, Agent, or Firm* — Fish & Richardson P.C.

(57) ABSTRACT

The present disclosure relates to localization methods, apparatuses, and systems. One example localization method includes obtaining phase value groups respectively corresponding to a plurality of anchor nodes, where phase values corresponding to the plurality of anchor nodes are obtained through measurement after the plurality of anchor nodes perform frequency shifting and receive a signal sent by a target node while performing frequency shifting, and the phase value group includes phase values of a plurality of frequencies, and determining a location of the target node based on the phase value groups respectively corresponding to the plurality of anchor nodes.

20 Claims, 6 Drawing Sheets

(58) Field of Classification Search
CPC ....... H04L 5/0053; H04L 5/0091; H04L 1/00; H04L 1/0041; H04L 1/0045; H04L 1/0069; H04L 1/08; G01S 5/0205; G01S 5/0246; G01S 5/0289; G01S 5/06; G01S 5/10; G01S 5/02; G01S 13/38; Y02D 30/70
See application file for complete search history.

(56) References Cited

U.S. PATENT DOCUMENTS

| | | | | |
|---|---|---|---|---|
| 8,102,784 | B1 * | 1/2012 | Lemkin | G01S 5/10 370/255 |
| 8,644,768 | B2 | 2/2014 | Kluge et al. | |
| 9,128,173 | B1 * | 9/2015 | Witzgall | G01S 5/12 |
| 10,574,393 | B1 * | 2/2020 | Ganwani | H04L 1/0061 |
| 10,859,666 | B1 * | 12/2020 | Kratz | H04W 56/002 |
| 11,029,144 | B2 * | 6/2021 | Chen | G01B 11/254 |
| 11,658,798 | B1 * | 5/2023 | Kratz | G01S 11/08 375/368 |
| 12,363,506 | B2 * | 7/2025 | Bilstad | G01S 5/02216 |
| 12,513,646 | B2 * | 12/2025 | Kleinbeck | H04B 17/23 |
| 2006/0109889 | A1 * | 5/2006 | Kim | H04B 1/7143 375/E1.035 |
| 2006/0174267 | A1 * | 8/2006 | Schmidt | H04S 3/008 725/39 |
| 2006/0251157 | A1 * | 11/2006 | Brenner | G01S 19/29 375/150 |
| 2008/0007450 | A1 * | 1/2008 | Yedidia | G01S 13/904 342/195 |
| 2008/0170858 | A1 * | 7/2008 | Barry | H04B 10/508 398/87 |
| 2009/0102706 | A1 * | 4/2009 | Goldblatt | H04B 7/18517 342/352 |
| 2009/0213973 | A1 * | 8/2009 | Yanagidate | H04L 7/0331 375/371 |
| 2010/0171657 | A1 * | 7/2010 | Liu | G01S 5/0289 342/357.29 |
| 2011/0150042 | A1 * | 6/2011 | Liu | H04B 1/713 375/135 |
| 2011/0150131 | A1 * | 6/2011 | Kang | H04L 25/03834 375/296 |
| 2013/0108000 | A1 * | 5/2013 | Park | H04J 3/0676 375/362 |
| 2013/0176445 | A1 * | 7/2013 | Streeter | G01S 17/36 348/208.1 |
| 2013/0232469 | A1 * | 9/2013 | Agarwal | G06F 8/71 717/121 |
| 2014/0146857 | A1 | 5/2014 | Guichard et al. | |
| 2014/0355727 | A1 * | 12/2014 | Xu | H04L 27/2621 375/344 |
| 2015/0195116 | A1 * | 7/2015 | Bae | H04L 27/26524 375/295 |
| 2015/0236773 | A1 * | 8/2015 | Kim | H04B 7/0626 375/295 |
| 2017/0134080 | A1 * | 5/2017 | Rahman | H04B 7/0478 |
| 2018/0275245 | A1 * | 9/2018 | Moshfeghi | G01S 13/38 |
| 2019/0044604 | A1 * | 2/2019 | Huang | H04B 7/0408 |
| 2019/0319355 | A1 * | 10/2019 | Ko | H01Q 15/10 |
| 2020/0116817 | A1 * | 4/2020 | Chuo | H04L 5/143 |
| 2020/0169862 | A1 * | 5/2020 | Moritomo | H02J 50/10 |
| 2020/0213971 | A1 * | 7/2020 | Ayyalasomayajula | H04W 4/029 |
| 2020/0274627 | A1 * | 8/2020 | Motoi | H04B 17/12 |
| 2021/0042875 | A1 * | 2/2021 | Meixner | G06F 9/30038 |
| 2021/0207974 | A1 * | 7/2021 | Zhou | G01C 21/206 |
| 2021/0257863 | A1 * | 8/2021 | Sato | G01R 19/16538 |
| 2021/0281125 | A1 * | 9/2021 | Sato | H02J 50/10 |
| 2021/0351828 | A1 * | 11/2021 | Gao | H04B 7/0478 |
| 2021/0389411 | A1 * | 12/2021 | Lipka | G01S 5/16 |
| 2022/0007139 | A1 * | 1/2022 | Li | G06N 3/08 |
| 2022/0123801 | A1 * | 4/2022 | Chen | H04B 7/0695 |
| 2022/0171012 | A1 * | 6/2022 | Duan | G01S 5/0205 |
| 2022/0255602 | A1 * | 8/2022 | Lee | H04B 7/0478 |
| 2022/0286176 | A1 * | 9/2022 | Grossmann | G06T 7/55 |
| 2022/0311488 | A1 * | 9/2022 | Shreevastav | H04W 64/00 |
| 2023/0324501 | A1 * | 10/2023 | Feigl | G01S 5/0273 342/451 |
| 2023/0333198 | A1 * | 10/2023 | Thompson | H04W 4/029 |
| 2023/0350344 | A1 * | 11/2023 | Wen | G03H 1/04 |
| 2024/0048979 | A1 * | 2/2024 | Lee | H04W 12/041 |
| 2024/0120778 | A1 * | 4/2024 | Shimura | H02J 50/10 |
| 2024/0179494 | A1 * | 5/2024 | Säily | H04W 4/029 |
| 2024/0195231 | A1 * | 6/2024 | Shimura | H02J 50/10 |
| 2025/0102613 | A1 * | 3/2025 | Bilstad | G01S 5/0284 |
| 2025/0300714 | A1 * | 9/2025 | Canonne-Velasquez | H04B 7/0691 |

FOREIGN PATENT DOCUMENTS

| | | | | |
|---|---|---|---|---|
| CN | 102221695 A | | 10/2011 | |
| EP | 1038188 B1 | * | 3/2003 | H04W 64/00 |
| EP | 3571862 B1 | * | 6/2022 | G06N 3/09 |
| JP | H08181637 A | | 7/1996 | |
| WO | 2009124071 A2 | | 10/2009 | |
| WO | WO-2022086378 A1 | * | 4/2022 | H04W 64/00 |

OTHER PUBLICATIONS

Schröder et al., "Accurate and Precise Distance Estimation from Phase-based Ranging Data," Proceedings of 2018 International Conference on Indoor Positioning and Indoor Navigation (IPIN), Sep. 24, 2018, 70 pages.

International Search Report in International Appln. No. PCT/CN2021/119469, mailed on May 25, 2022, 16 pages (with English Translation).

* cited by examiner

LOCALIZATION METHOD, APPARATUS, AND SYSTEM

CROSS-REFERENCE TO RELATED APPLICATIONS

This application is a continuation of International Application No. PCT/CN2021/119469, filed on Sep. 18, 2021, the disclosure of which is hereby incorporated by reference in its entirety.

TECHNICAL FIELD

This application relates to the field of wireless technologies, and in particular, to a localization method, apparatus, and system.

BACKGROUND

With development of wireless technologies, as an important application of wireless technologies, a wireless localization technology is widely applied to fields such as navigation and target node localization. Currently, a localization system may localize a target node through the wireless localization technology. The localization system generally includes at least one target node, a plurality of anchor nodes, and a processing device.

When the target node is localized by the localization system, for the target node and any anchor node, the target node and the any anchor node send signals to each other at a plurality of measurement frequencies and perform phase measurement, to obtain a plurality of phase values of the target node and the any anchor node at the plurality of frequencies. The processing device obtains a distance between the target node and the any anchor node based on the plurality of phase values, to obtain a distance between the target node and each anchor node, and then determines a location of the target node based on the distance between the target node and each anchor node.

However, in the localization process, the target node and each anchor node both need to separately send signals to each other at the plurality of measurement frequencies, and a quantity of signal sending times is great. As a result, the localization process is time-consuming, and localization efficiency is low.

SUMMARY

This application provides a localization method, apparatus, and system, to improve localization accuracy while improving localization efficiency.

According to a first aspect, this application provides a localization method. The method includes: obtaining phase value groups respectively corresponding to a plurality of anchor nodes, where phase values corresponding to the plurality of anchor nodes are obtained through measurement after the plurality of anchor nodes perform frequency shifting and receive a signal sent by a target node while performing frequency shifting, and the phase value group includes phase values of a plurality of frequencies; and determining a location of the target node based on the phase value groups respectively corresponding to the plurality of anchor nodes.

In the localization method, the target node performs frequency shifting and sends the signal. For the plurality of anchor nodes, the target node only needs to perform frequency shifting and send a signal once, to implement localization of the target node. This reduces the quantity of signal sending times required for localizing the target node, thereby reducing time consumption of a localization process, and improving localization efficiency and a refresh rate of the location of the target node. When the target node is in a moving state, accuracy of determining the location of the target node is high. In addition, power consumption of the target node is reduced, and a use time of the target node is increased. In addition, interference to another wireless device and interference caused by another wireless device are effectively reduced, and difficulty in scheduling performed by the target node for co-existence among different wireless technologies is reduced.

In a possible implementation, the anchor node is configured to perform frequency shifting based on a first frequency shifting curve and continuously receive the signal, the target node is configured to perform frequency shifting based on a second frequency shifting curve and continuously send the signal, and start moments of first frequency shifting curves of the plurality of anchor nodes are the same. In this way, first frequency shifting curves of a plurality of anchor nodes in a same coordinate system may overlap, so that areas of non-overlapping parts of the plurality of anchor nodes and the target node are the same. The areas of the non-overlapping parts may be canceled between the plurality of anchor nodes, to cancel impact of the non-overlapping parts on localization accuracy. This reduces the quantity of signal sending times, and eliminates impact of the difference on a localization result, thereby improving accuracy of the localization result.

In a possible implementation, the method further includes: sending synchronization information to the plurality of anchor nodes, where the synchronization information is used to synchronize clocks of the plurality of anchor nodes, and the plurality of anchor nodes are configured to perform, based on the synchronized clock, frequency shifting based on the first frequency shifting curves and continuously receive the signal. In this way, start moments of second frequency shifting curves of the plurality of anchor nodes may be the same.

In an example, the processing device may send the synchronization information, to continuously synchronize the clocks of the plurality of anchor nodes in a frequency shifting process of the plurality of anchor nodes, so that the clocks of the plurality of anchor nodes are completely synchronized in the frequency shifting process. For example, the synchronization information may include a unified external clock (for example, an external clock).

In another example, the processing device may send the synchronization information, to synchronize the clocks of the plurality of anchor nodes before the plurality of anchor nodes start to perform frequency shifting and receive the signal, and synchronize the clocks of the plurality of anchor nodes to the start moments of the second frequency shifting curves of the plurality of anchor nodes, so that the start moments of the second frequency shifting curves of the plurality of anchor nodes are consistent. Optionally, the synchronization information may include a pulse signal. The processing device may be connected to the plurality of anchor node through cables. Before the plurality of anchor nodes start to perform frequency shifting and receive the signal, the processing device broadcasts the pulse signal at a preset period until reaching the start moments of the second frequency shifting curves of the plurality of anchor nodes.

In the foregoing example, for a manner in which the processing device is connected to the plurality of anchor node through cables for synchronization, cable length compensation may be performed on the phase values of the plurality of frequencies obtained by each anchor node through measurement. For example, a difference between moments at which the pulse signal arrives at the anchor nodes (that is, a difference between start moments of frequency shifting curves of the anchor nodes) may be determined based on a known cable length, and then cable length compensation is performed, based on the moment difference, on the phase values of the plurality of frequencies obtained by each anchor node through measurement.

In a possible implementation, the plurality of frequencies include at least one target frequency; and the determining a location of the target node based on the phase value groups respectively corresponding to the plurality of anchor nodes includes: determining, based on a phase value of the target frequency corresponding to the anchor node, a frequency offset of the anchor node at the target frequency; separately performing, through the frequency offset of the anchor node at the target frequency, compensation on phase values in the phase value group corresponding to the anchor node; and determining the location of the target node based on the phase value groups respectively corresponding to the plurality of anchor nodes obtained after compensation is performed.

For example, for any target frequency, a frequency offset at the any target frequency may be determined based on a relationship of a change in phase values obtained through measurement by the anchor node at a plurality of moments of a time period that the any target frequency is in with the plurality of moments. Optionally, the processing device may determine any one of the frequency offsets respectively corresponding to the plurality of target frequencies as the target frequency offset, or determine an average value, a median, or a common of the frequency offsets respectively corresponding to the plurality of target frequencies as the target frequency offset.

A manner of separately performing, through the frequency offset of the anchor node at the target frequency, compensation on phase values in the phase value group corresponding to the anchor node includes frequency offset compensation and clock compensation. In a possible implementation, the compensation manner includes frequency offset compensation, the phase value group corresponding to the anchor node is obtained through measurement by the anchor node at a plurality of measurement moments; and the separately performing, through the frequency offset of the anchor node at the target frequency, compensation on phase values in the phase value group corresponding to the anchor node includes: determining a reference moment in the plurality of measurement moments; and separately performing, based on the reference moment and the frequency offset of the anchor node at the target frequency, frequency offset compensation on the phase values in the phase value group corresponding to the anchor node.

In a possible implementation, the compensation manner includes clock compensation; and the separately performing, through the frequency offset of the anchor node at the target frequency, compensation on phase values in the phase value group corresponding to the anchor node includes: determining a ratio of the frequency offset of the anchor node at the target frequency to the target frequency; and separately performing, based on the start moment of the first frequency shifting curve of the anchor node and the ratio, clock compensation on the phase values in the phase value group corresponding to the anchor node.

In a possible implementation, the plurality of anchor nodes form at least one anchor node group, and the anchor node group includes two anchor nodes; and the determining a location of the target node based on the phase value groups respectively corresponding to the plurality of anchor nodes includes: separately performing difference processing on phase values of a same frequency corresponding to the two anchor nodes in the anchor node group, to obtain a phase difference between the plurality of frequencies corresponding to the anchor node group; obtaining, based on the phase difference between the plurality of frequencies corresponding to the anchor node group, a distance difference between the two anchor nodes in the anchor node group and the target node; and determining the location of the target node by using distance differences respectively corresponding to the at least one anchor node group.

For example, difference calculation may be performed on the phase values of a same frequency corresponding to the two anchor nodes in each anchor node group, to obtain a phase difference between the plurality of frequencies corresponding to each anchor node group. Then, the distance difference between the two anchor nodes in the anchor node group and the target node may be determined based on a slope of a change in the phase difference between the plurality of frequencies corresponding to the anchor node group with frequency.

Further, the location of the target node may be determined in a time difference of arrival manner through the distance difference (that is, a distance difference between the two anchor nodes in each anchor node group and the target node) corresponding to the at least one anchor node group.

In a possible implementation, the method further includes: generating and separately sending first curve information to the plurality of anchor nodes, where the first curve information is used by the plurality of anchor nodes to separately determine the first frequency shifting curves; and generating and sending second curve information to the target node, where the second curve information is used by the target node to determine the second frequency shifting curve; the first curve information includes at least one of the following: the start moment of the first frequency shifting curve, the plurality of frequencies, an end moment of each frequency in the plurality of frequencies, a time period of each frequency in the plurality of frequencies, and duration of each frequency in the plurality of frequencies; and the second curve information includes at least one of the following: a start moment of the second frequency shifting curve, the plurality of frequencies, an end moment of each frequency in the plurality of frequencies, a time period of each frequency in the plurality of frequencies, and duration of each frequency in the plurality of frequencies.

According to a second aspect, this application provides a localization method. The method includes: performing frequency shifting and receiving a signal sent by a target node while performing frequency shifting; obtaining, based on the signal, phase values of a plurality of frequencies through measurement; and sending the phase values of the plurality of frequencies to a processing device, where the phase values of the plurality of frequencies are used by the processing device to determine a location of the target node.

In a possible implementation, the performing frequency shifting and receiving a signal sent by a target node while performing frequency shifting includes: performing the frequency shifting based on a first frequency shifting curve and continuously receiving the signal, where the signal is continuously sent by the target node while performing the frequency shifting based on a second frequency shifting curve.

In a possible implementation, the method further includes: determining curve information, where the curve information includes at least one of the following: a start moment of the first frequency shifting curve, the plurality of frequencies, an end moment of each frequency, a time period of each frequency, and duration of each frequency; and determine the first frequency shifting curve based on the curve information.

The curve information may be determined by the processing device and sent to the anchor node. When the curve information includes the start moment of the first frequency shifting curve, in an implementation, the start moment of the first frequency shifting curve may be determined by the processing device and sent to the anchor node. In another implementation, the start moment of the first frequency shifting curve may be determined by the anchor node.

When the start moment of the first frequency shifting curve is determined by the anchor node, in a possible implementation, the curve information includes the start moment of the first frequency shifting curve; and the determining curve information includes: receiving indication information sent by the target node, where the indication information indicates a duration interval; and determining the start moment of the first frequency shifting curve based on a moment at which the indication information is received and the duration interval. Optionally, a moment that delays the duration interval after the moment at which the indication information is received may be determined as the start moment of the first frequency shifting curve.

In a possible implementation, the plurality of frequencies include at least one target frequency; and the obtaining, based on the signal, phase values of a plurality of frequencies through measurement includes: obtaining, based on the signal, a phase value of the target frequency through measurement at a plurality of moments of a time period that the target frequency is in; and obtaining, based on the signal, a phase value of a non-target frequency through measurement at at least one moment of a time period that the non-target frequency is in.

According to a third aspect, this application provides a localization method. The method includes: performing frequency shifting and sending a signal, where the signal is separately received by a plurality of anchor nodes while performing frequency shifting, the plurality of anchor nodes are configured to separately obtain corresponding phase value groups through measurement based on the signal, the phase value groups respectively corresponding to the plurality of anchor nodes are used by a processing device to determine a location of a target node, and the phase value group includes a plurality of phase values.

In a possible implementation, the performing frequency shifting and sending a signal includes: performing the frequency shifting based on a first frequency shifting curve and continuously sending the signal, where the signal is continuously received by the plurality of the anchor nodes separately while performing the frequency shifting based on second frequency shifting curves.

For example, a frequency may be shifted to a plurality of frequencies based on the first frequency shifting curve, and the signal is sent. A manner of sending the signal may be broadcast. The first frequency shifting curve is a curve in which a frequency changes with time, and shows a plurality of frequencies and a time period corresponding to each frequency.

In a possible implementation, the method further includes: determining first curve information, where the first curve information includes at least one of the following: a start moment of the first frequency shifting curve, the plurality of frequencies, an end moment of each frequency in the plurality of frequencies, a time period of each frequency in the plurality of frequencies, and duration of each frequency in the plurality of frequencies; and determining the first frequency shifting curve based on the first curve information.

In a possible implementation, the method further includes: separately sending indication information to the plurality of anchor nodes, where the indication information indicates a duration interval, the duration interval is used by the plurality of anchor nodes to separately determine second curve information, and the second curve information is used by the plurality of anchor nodes to separately determine the second frequency shifting curves; and the second curve information includes at least one of the following: a start moment of the second frequency shifting curve, the plurality of frequencies, an end moment of each frequency, a time period of each frequency, and duration of each frequency.

Optionally, the start moment of the first frequency shifting curve of the target node may be determined first, and then the duration interval may be determined based on the start moment of the first frequency shifting curve. For example, an interval between the start moment of the first frequency shifting curve and a moment at which the target node sends the indication information may be determined as the duration interval. In this way, a difference between the start moment of the second frequency shifting curve of the anchor node and the start moment of the first frequency shifting curve can be small, to avoid impact of an excessively large difference on localization accuracy. The duration interval may alternatively be a preset value in the target node.

According to a fourth aspect, this application provides a localization method. The method includes: obtaining phase value groups respectively corresponding to a plurality of frequency shifting processes of a target node, where the plurality of frequency shifting processes correspond to a plurality of anchor nodes, the phase value group corresponding to the frequency shifting process is obtained through measurement after the target node performs frequency shifting and receives a signal sent by a corresponding anchor node while performing frequency shifting, and the phase value group includes phase values of a plurality of frequencies; and determining a location of the target node based on the phase value groups respectively corresponding to the plurality of frequency shifting processes.

In the localization method, each anchor node performs frequency shifting and sends a signal, and a quantity of signal sending times required for localizing a plurality of target nodes is equal to a quantity of anchor nodes. When the quantity of anchor nodes in the localization system is less than the quantity of target nodes, the quantity of signal sending times can be further reduced, thereby reducing time consumption of a localization process, and improving localization efficiency and a refresh rate of the location of the target node. When the target node is in a moving state, accuracy of determining the location of the target node is high. In addition, power consumption of the target node is reduced, and a use time of the target node is increased. In addition, interference to another wireless device and interference caused by another wireless device are effectively reduced, and difficulty in scheduling performed by the target node for co-existence among different wireless technologies is reduced.

In a possible implementation, each frequency shifting process in the plurality of frequency shifting processes corresponds to one first frequency shifting curve, the target node is configured to perform the frequency shifting based on the corresponding first frequency shifting curve and continuously receive the signal sent by the corresponding anchor node in the frequency shifting process, and the anchor node is configured to perform the frequency shifting based on a second frequency shifting curve and continuously send the signal; and an interval between start moments of first frequency shifting curves corresponding to any two frequency shifting processes of the target node is the same as an interval between start moments of second frequency shifting curves of two anchor nodes corresponding to the any two frequency shifting processes.

The plurality of anchor nodes perform frequency shifting based on the second frequency shifting curves. The plurality of frequency shifting processes correspond to the first frequency shifting curves. An interval between start moments of first frequency shifting curves corresponding to any two frequency shifting processes is the same as an interval between start moments of second frequency shifting curves of two corresponding anchor nodes, so that areas of non-overlapping parts of the first frequency shifting curves corresponding to the plurality of frequency shifting processes and the second frequency shifting curve of the corresponding anchor node are the same. The areas of the non-overlapping parts may be canceled between the plurality of frequency shifting processes, to cancel impact of the non-overlapping parts on localization accuracy. This reduces the quantity of signal sending times, and eliminates impact of a difference on a localization result, thereby improving accuracy of the localization result.

In a possible implementation, the method further includes: sending synchronization information to the plurality of anchor nodes, where the synchronization information is used to synchronize clocks of the plurality of anchor nodes, and the plurality of anchor nodes are configured to perform, based on the synchronized clock, the frequency shifting based on the second frequency shifting curves and continuously send the signal.

In a possible implementation, the plurality of frequencies include at least one target frequency; and the determining a location of the target node based on the phase value groups respectively corresponding to the plurality of frequency shifting processes includes: determining, based on a phase value of the target frequency corresponding to the frequency shifting process, a frequency offset of the target node at the target frequency in the frequency shifting process; separately performing, through the frequency offset of the target node at the target frequency in the frequency shifting process, compensation on phase values in the phase value group corresponding to the frequency shifting process; and determining the location of the target node based on the phase value group corresponding to the frequency shifting process obtained after compensation is performed.

A manner of separately performing, through the frequency offset of the target node at the target frequency in the frequency shifting process, compensation on phase values in the phase value group corresponding to the frequency shifting process includes frequency offset compensation and clock compensation. In a possible implementation, the compensation manner includes frequency offset compensation, and the phase value group corresponding to the frequency shifting process is obtained through measurement by the target node at a plurality of measurement moments; and the separately performing, through the frequency offset of the target node at the target frequency in the frequency shifting process, compensation on phase values in the phase value group corresponding to the frequency shifting process includes: determining a reference moment in the plurality of measurement moments in the frequency shifting process; separately performing, based on the reference moment in the frequency shifting process and the frequency offset of the target node at the target frequency, frequency offset compensation on the phase values in the phase value group corresponding to the frequency shifting process.

In a possible implementation, the compensation manner includes clock compensation; and the separately performing, through the frequency offset of the target node at the target frequency in the frequency shifting process, compensation on phase values in the phase value group corresponding to the frequency shifting process includes: determining a ratio of the frequency offset of the target node at the target frequency in the frequency shifting process to the target frequency; separately performing, based on the start moment of the first frequency shifting curve corresponding to a first frequency shifting process in the plurality of frequency shifting processes and the ratio, clock compensation on the phase values in the phase value group corresponding to the frequency shifting process.

In a possible implementation, the plurality of frequency shifting processes form at least one frequency shifting process group, and the frequency shifting process group includes two frequency shifting processes; and the determining a location of the target node based on the phase value groups respectively corresponding to the plurality of frequency shifting processes includes: separately performing difference processing on phase values of a same frequency corresponding to the two frequency shifting processes in the frequency shifting process group, to obtain a phase difference between the plurality of frequencies corresponding to the frequency shifting process group; obtaining, based on the phase difference between the plurality of frequencies corresponding to the frequency shifting process group, a distance difference between two anchor nodes corresponding to the frequency shifting process group and the target node; and determining the location of the target node by using distance differences respectively corresponding to the at least one frequency shifting process group.

The processing device may perform difference calculation on the phase values of the same frequency corresponding to the two frequency shifting processes in the frequency shifting process group, to obtain the phase difference between the plurality of frequencies corresponding to the frequency shifting process group. Then, the difference between the distances between the two anchor nodes corresponding to the two frequency shifting processes in the frequency shifting process group and the target node is determined based on a slope of a change in the phase difference between the plurality of frequencies corresponding to the frequency shifting process group the frequency.

In a possible implementation, the method further includes: generating and sending first curve information and second curve information of each frequency shifting process in the plurality of frequency shifting processes to the target node, where the first curve information and the second curve information are used by the target node to determine the first frequency shifting curves respectively corresponding to the plurality of frequency shifting processes; and generating and separately sending third curve information to the plurality of anchor nodes, where the third curve information is used by the plurality of anchor nodes to separately determine the second frequency shifting curves; the first curve information includes at least one of the following: a start moment of the first frequency shifting curve corresponding to each frequency shifting process in the plurality of frequency shifting processes, the start moment of the first frequency shifting curve corresponding to the first frequency shifting process in the plurality of frequency shifting processes, and an interval between start moments of first frequency shifting curves corresponding to each two adjacent frequency shifting processes; the second curve information includes at least one of the following: the plurality of frequencies, an end moment of each frequency in the plurality of frequencies, a time period of each frequency in the plurality of frequencies, and duration of each frequency in the plurality of frequencies; and the third curve information includes at least one of the following: a start moment of the second frequency shifting curve, the plurality of frequencies, an end moment of each frequency in the plurality of frequencies, a time period of each frequency in the plurality of frequencies, and duration of each frequency in the plurality of frequencies.

According to a fifth aspect, this application provides a localization method. The method includes: performing frequency shifting and sending a signal, where the signal is received by a target node while performing frequency shifting in a corresponding frequency shifting process in a plurality of frequency shifting processes, the target node is configured to obtain, based on the signal, phase values of a plurality of frequencies corresponding to the frequency shifting process through measurement, and the phase values of the plurality of frequencies corresponding to the frequency shifting process are used by a processing device to determine a location of the target node.

In a possible implementation, the performing frequency shifting and sending a signal includes: performing the frequency shifting based on a first frequency shifting curve and continuously sending the signal, where the target node is configured to perform the frequency shifting based on a corresponding second frequency shifting curve and continuously receive the signal in the corresponding frequency shifting process. Optionally, a frequency may be shifted to a plurality of frequencies based on the first frequency shifting curve, and the signal is sent. A manner of sending the signal may be broadcast.

In a possible implementation, the method further includes: determining first curve information, where the first curve information includes at least one of the following: a start moment of the first frequency shifting curve, the plurality of frequencies, an end moment of each frequency in the plurality of frequencies, a time period of each frequency in the plurality of frequencies, and duration of each frequency in the plurality of frequencies; and determining the first frequency shifting curve based on the first curve information.

In a possible implementation, the method further includes: sending indication information to the target node, where the indication information indicates a duration interval, the duration interval is used by the target node to determine second curve information and third curve information of each frequency shifting process in the plurality of frequency shifting processes, and the second curve information and the third curve information is used by the target node to determine second frequency shifting curves respectively corresponding to the plurality of frequency shifting processes; the second curve information includes at least one of the following: a start moment of a second frequency shifting curve corresponding to each frequency shifting process in the plurality of frequency shifting processes, a start moment of a second frequency shifting curve corresponding to a first frequency shifting process in the plurality of frequency shifting processes, and an interval between start moments of second frequency shifting curves corresponding to each two adjacent frequency shifting processes; the third curve information includes at least one of the following: the plurality of frequencies, an end moment of each frequency in the plurality of frequencies, a time period of each frequency in the plurality of frequencies, and duration of each frequency in the plurality of frequencies. Optionally, the start moment of the first frequency shifting curve of the target node may be determined first, and then the duration interval may be determined based on the start moment of the first frequency shifting curve.

According to a sixth aspect, this application provides a localization method. The method includes: performing, in each frequency shifting process in a plurality of frequency shifting processes, frequency shifting and receiving a signal sent by a corresponding anchor node while performing frequency shifting; obtaining, based on the signal in the plurality of frequency shifting processes, phase value groups respectively corresponding to the plurality of frequency shifting processes through measurement, where the phase value group includes phase values of a plurality of frequencies; and sending, to a processing device, the phase value groups respectively corresponding to the plurality of frequency shifting processes, where the phase value groups respectively corresponding to the plurality of frequency shifting processes are used by the processing device to determine a location of a target node.

In a possible implementation, the performing, in each frequency shifting process in a plurality of frequency shifting processes, frequency shifting and receiving a signal sent by a corresponding anchor node while performing frequency shifting includes: performing, in the frequency shifting process, the frequency shifting based on a first frequency shifting curve corresponding to the frequency shifting process and continuously receiving the signal, where the signal is continuously sent by the anchor node corresponding to the frequency shifting process while performing the frequency shifting based on a second frequency shifting curve.

In a possible implementation, the method further includes: determining first curve information, where the first curve information includes at least one of the following: a start moment of the first frequency shifting curve corresponding to each frequency shifting process in the plurality of frequency shifting processes, a start moment of the first frequency shifting curve corresponding to a first frequency shifting process in the plurality of frequency shifting processes, and an interval between start moments of first frequency shifting curves corresponding to each two adjacent frequency shifting processes; determining second curve information of each frequency shifting process in the plurality of frequency shifting processes, where the second curve information includes at least one of the following: the plurality of frequencies, an end moment of each frequency in the plurality of frequencies, a time period of each frequency in the plurality of frequencies, and duration of each frequency in the plurality of frequencies; and determining, based on the first curve information and the second curve information of each frequency shifting process in the plurality of frequency shifting processes, the first frequency shifting curves respectively corresponding to the plurality of frequency shifting processes.

In a possible implementation, the first curve information includes the start moment of the first frequency shifting curve corresponding to the first frequency shifting process; and the determining first curve information includes: receiving indication information sent by the anchor node, where the indication information indicates a duration interval; and determining, based on a moment at which the indication information is received and the duration interval, the start moment of the first frequency shifting curve corresponding to the first frequency shifting process.

In a possible implementation, the plurality of frequencies include at least one target frequency; and the obtaining, based on the signal in the plurality of frequency shifting processes, phase value groups respectively corresponding to the plurality of frequency shifting processes through measurement includes: obtaining, in the frequency shifting process based on the signal, a phase value of the target frequency corresponding to the frequency shifting process through measurement at a plurality of moments of a time period that the target frequency is in; and obtaining, in the frequency shifting process based on the signal, a phase value of the non-target frequency corresponding to the frequency shifting process through measurement at at least one moment of a time period that a non-target frequency is in.

According to a seventh aspect, this application provides a processing device, including: one or more processors; and a memory, configured to store one or more computer programs or instructions. When the one or more computer programs or instructions are executed by the one or more processors, the one or more processors are enabled to implement the method according to any one of the first aspect or the fourth aspect.

According to an eighth aspect, this application provides an anchor node, including: one or more processors; and a memory, configured to store one or more computer programs or instructions. When the one or more computer programs or instructions are executed by the one or more processors, the one or more processors are enabled to implement the method according to any one of the second aspect or the fifth aspect.

According to a ninth aspect, this application provides a target node, including: one or more processors; and a memory, configured to store one or more computer programs or instructions. When the one or more computer programs or instructions are executed by the one or more processors, the one or more processors are enabled to implement the method according to any one of the third aspect or the sixth aspect.

According to a tenth aspect, this application provides a computer-readable storage medium, including a computer program or instructions, where when the computer program or the instructions are executed on a computer, the computer is enabled to perform the method according to any one of the first aspect to the sixth aspect.

According to a tenth aspect, this application provides a computer program product, where the computer program product includes computer program code, and when the computer program code is run on a computer, the computer is enabled to perform the method according to any one of the first to the sixth aspects.

According to a twelfth aspect, this application provides a localization system, where the localization system includes the processing device according to the seventh aspect, the anchor node according to the eighth aspect, and the target node according to the ninth aspect.

DESCRIPTION OF EMBODIMENTS

Figure 1:
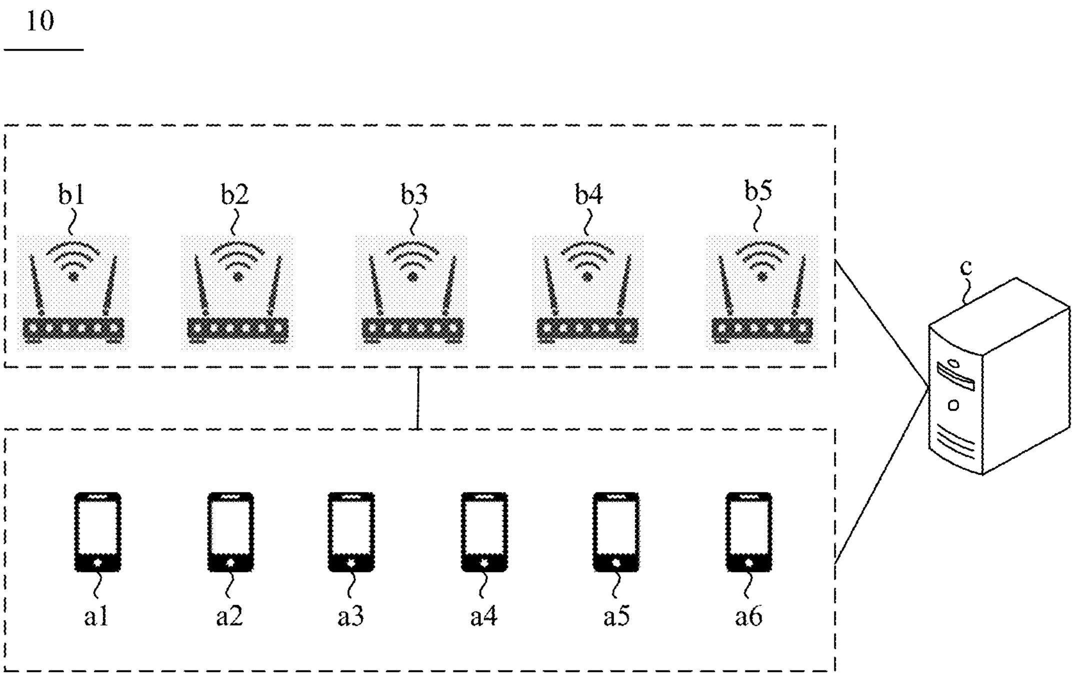
FIG. 1 is a schematic diagram of a structure of a localization system according to an embodiment of this application.

To make the objectives, technical solutions, and advantages of this application clearer, the following clearly and completely describes the technical solutions of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

In this specification, embodiments, claims, and accompanying drawings of this application, terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

Wireless technologies generally include a 5th generation mobile communication technology (5G), a wireless fidelity (WiFi) technology, an ultra wide band (UWB) technology, a low-power narrow band wireless technology, and the like. The low-power narrow band wireless technology usually includes Bluetooth and Zigbee. The low-power narrow band wireless technology has a wide application scenario in an industrial internet of things (IIoT) field, a terminal device field (for example, a mobile phone and a wearable device), a home device field (for example, a smart home), and the like due to advantages such as low power consumption, simple design, and low device costs.

As an important application of wireless technologies, a wireless localization technology is widely applied to fields such as navigation and target node localization. In the technology, a distance between nodes can be measured, and then a target node can be localized through the distance between the nodes.

Currently, a localization system may localize the target node through the wireless localization technology. The localization system generally includes at least one target node, a plurality of anchor nodes, and a processing device. Localizing any target node is used as an example. The any target node and the plurality of anchor nodes separately send signals to each other at a plurality of frequencies and perform phase measurement, to obtain phase value groups respectively corresponding to the plurality of anchor nodes. The phase value group include phase values of the plurality of frequencies and phase values of the any target node corresponding to each anchor node at the plurality of frequencies. The processing device obtains distances between the any target node and the plurality of anchor nodes based on the phase value groups respectively corresponding to the plurality of anchor nodes and the phase values of the any target node corresponding to each anchor node at the plurality of frequencies. Then, a location of the any target node is determined based on the distances between the any target node and the plurality of anchor nodes.

In the localization process provided in a conventional technology, the target node and each anchor node both need to separately send signals to each other at the plurality of frequencies, and a quantity of signal sending times is great. In addition, the higher required localization accuracy, the greater a quantity of anchor nodes in the localization system, and therefore, the greater the quantity of signal sending times. If each node sending a signal at the plurality of frequencies is considered as one signal sending, when the localization system includes N anchor nodes, 2N signal sending times are required to implement localization of one target node.

If a signal is sent for an excessive quantity of times, the localization process is time-consuming, and localization efficiency and a refresh rate of a location of a target node are affected. When the target node is in a moving state, accuracy of determining the location of the target node is low. If the quantity of signal sending times is excessively great, power consumption of the target node is large. The target node is generally powered by a battery, and the large power consumption reduces use time of the target node. In addition, there is strong interference to another wireless device, or interference from another wireless device readily occurs. For example, interference generated in an industrial scientific medical band (ISM band) is severe. In addition, when the target node is a device in which a plurality of wireless technologies coexist, it is more difficult for the target node to perform scheduling for co-existence among different wireless technologies. The plurality of wireless technologies usually coexist and are scheduled in time division multiple access (TDMA) mode. When a wireless technology used to transmit and receive signals occupies for a long time, transmission and reception opportunities of other wireless technologies are reduced.

An embodiment of this application provides a localization system. The localization system localizes a target node based on phase measurement at a plurality of frequencies. FIG. 1 is a schematic diagram of a structure of a localization system according to an embodiment of this application. The localization system 10 includes six target nodes $a_1$ to $a_6$, five anchor nodes $b_1$ to $b_5$, and one processing device c. Signal transmission can be performed between the anchor node, the target node, and the processing device. The localization system 10 may determine phase values of a plurality of frequencies by transmitting a signal (for example, a carrier signal), and then determine a distance difference between the target node and the plurality of anchor nodes based on the phase values of the plurality of frequencies, to localize the target node based on the difference between the distances between the target node and the plurality of anchor nodes.

A relationship between a phase and a distance is described first below. In a localization system, when a signal is transmitted from a sending node to a receiving node, a phase value of the signal at the receiving node lags behind a phase value of the signal at the sending node at a same time. The lag value is $\Delta\varphi=-(Df/c)*2\pi \bmod 2\pi$, where D represents a distance between two nodes, c represents a speed of light, f represents a frequency, and $f/c=1/\lambda$ and $\lambda$ represents a wavelength of the signal.

Figure 2:
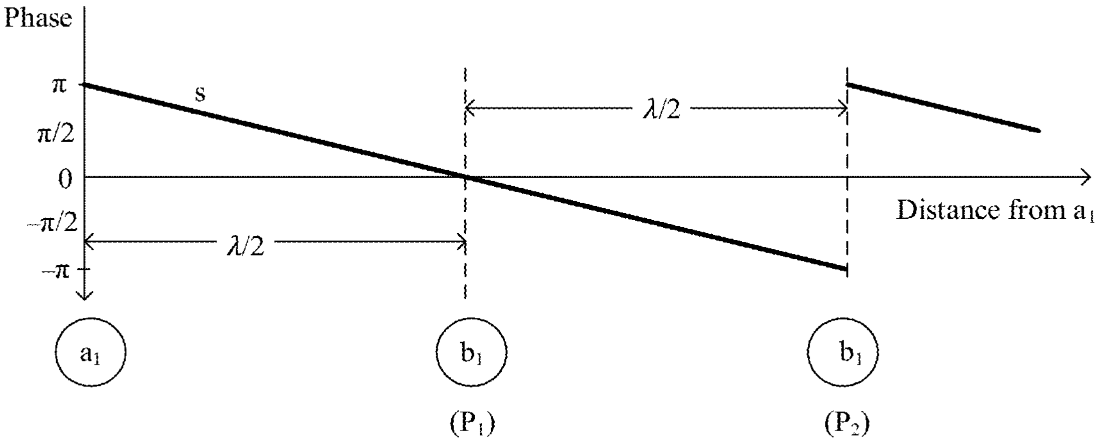
FIG. 2 is a schematic diagram of a relationship between a phase and a distance according to an embodiment of this application.

The target node $a_1$ and the anchor node $b_1$ are used as an example to describe the relationship between the phase and the distance. FIG. 2 is a schematic diagram of a relationship between a phase and a distance according to an embodiment of this application, where s is a carrier signal that is sent by a target node $a_1$ to an anchor node $b_1$ at a moment and that has a frequency of f, a horizontal axis represents the distance, and a vertical axis represents the phase. It is assumed that phases of local oscillators (LO) of the target node $a_1$ and the anchor node $b_1$ at the moment are $\varphi a_1$ and obi respectively, that is, an initial phase of s is $\varphi a_1$. When the anchor node $b_1$ is located at a location $P_1$, a distance D between the anchor node $b_1$ and the target node is $\lambda/2$. When the signal s is transmitted to the anchor node $b_1$, a phase of the signal s at $P_1$ lags behind a phase of the signal s at a location at which a1 is located at a same time. The lag value is $\Delta\varphi=-(\lambda/2\lambda)*2\pi \bmod 2\pi=-\pi$, that is, a phase value of the signal s at the anchor node $b_1$ is $\varphi a_1-\pi$. When the anchor node $b_1$ is located at a location $P_2$, the distance between the anchor node $b_1$ and the target node is $2\lambda$. When the signal s is transmitted to the anchor node $b_1$, a phase of the signal s at $P_2$ lags behind the phase of the signal s at the location at which a1 is located at a same time. The lag value is $\Delta\varphi=-(2\lambda/\lambda)*2\pi \bmod 2\pi=0$, that is, the phase value of the signal s at the anchor node $b_1$ is $\varphi a_1$. In FIG. 2, it is assumed that $\varphi a_1$ is $\pi/2$. When the anchor node $b_1$ is located at the location $P_1$, the phase value of the signal s at the anchor node $b_1$ is $-\pi/2$. When the anchor node $b_1$ is located at the location $P_2$, the phase value of the signal s at the anchor node $b_1$ is $\pi/2$.

It should be noted that when any node receives a signal sent by another node, a mixer of the node performs, based on an LO signal, frequency reduction processing on the signal sent by the another node, to obtain a frequency-reduced direct current signal. Using FIG. 2 as an example, a phase of a signal obtained after frequency reduction is performed by the anchor node $b_1$ on a signal sent by the target node $a_1$ is $\varphi a_1+\Delta\varphi-\varphi b_1$, and a phase of a signal obtained after frequency reduction is performed by the target node $a_1$ on a signal sent by the anchor node $b_1$ is $\varphi b_1+\Delta\varphi-\varphi a_1$. A phase obtained by any node through measurement based on a received signal is a phase of a signal obtained after frequency reduction. That is, when the anchor node $b_1$ is located at the location $P_1$, the phase of the signal sent by the target node $a_1$ that is obtained through measurement is $\varphi a_1-\pi-\varphi b_1$. When the anchor node $b_1$ is located at the location $P_2$, the phase of the signal sent by the target node $a_1$ that is obtained through measurement is $\varphi a_1-\varphi b_1$.

It should be further noted that the signal s is usually expressed as $s=\sin(2\pi ft+\varphi_0)$, and do represents an initial phase of the signal s. It can be learned from the formula that the phase of the signal s is related to time and the initial phase. Because a node that receives the signal s performs frequency reduction processing on the signal, to cancel a variation (that is, $2\pi ft$) of the phase of the signal s with time, in a calculation formula of a phase that is obtained by the node that receives the signal s through measurement in this embodiment of this application, only impact of the initial phase on a measurement result is considered.

The mixer of the any node reduces a frequency of the received signal to obtain a signal whose frequency is 0, to implement frequency reduction processing. In this embodiment of this application, the any node may be a zero intermediate frequency (zero IF) node or a low intermediate frequency (Low-IF) node. Correspondingly, the any node may directly reduce the frequency of the received signal to obtain the signal whose frequency is 0, or first reduce the frequency of the received signal to obtain the low intermediate frequency signal, and then reduce the frequency to obtain the signal whose frequency is 0. A manner in which the node in the localization system performs frequency reduction on the received signal is not limited in this embodiment of this application.

The localization system provided in this embodiment of this application may be used to localize any node whose location is unknown. The node includes a target node and an anchor node, and the target node and the anchor node may be a same device or different devices. A location of the target node is unknown and can be fixed or changed. A location of the anchor node is known and fixed.

For example, the target node may be a terminal device, the anchor node may be a base station, and the processing device may be a computer device, a server, or the like. The terminal device may include an access terminal, a terminal unit, a terminal station, a mobile station, a mobile console, a remote station, a remote terminal, a mobile device, a wireless communication device, a terminal agent, a terminal apparatus, and the like. The access terminal may include a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, a terminal device in a 5G network, a terminal device in an evolved public land mobile network (PLMN), or the like. The base station may include a base station in a fourth generation mobile communication technology (4G) system and a base station in a 5G system. The base station in the 4G system may include an evolved base station (eNB) in a long term evolution (LTE) communication system and a wireless controller in a cloud radio access network (CRAN) communication system. The base station in the 5G communication system may include a base station in a new radio (NR) communication system, a network device, a wearable device, and an in-vehicle device in a PLMN communication system, and the like.

It should be noted that the localization system shown in FIG. 1 is merely an example for description, and does not limit a structure of the localization system and a quantity of devices included in the localization system.

An embodiment of this application provides a localization method. The localization method may be applied to the foregoing localization system, for example, applied to the target node, the anchor node, and the processing device in the foregoing localization system. A process of localizing any target node requires a plurality of anchor nodes to receive or send signals. In an implementation, the target node sends a signal, and the plurality of anchor nodes receive the signal and measure a phase, to determine a location of the target node based on the phase. In this implementation, when the plurality of target nodes are localized, a quantity of signal sending times is equal to a quantity of target nodes. In another implementation, the plurality of anchor nodes send signals, and the target node receives the signals and measures phases, to determine a location of the target node based on the phases. In this implementation, when the plurality of target nodes are localized, a quantity of signal sending times is equal to a quantity of anchor nodes.

Optionally, when a quantity of target nodes that need to be localized in the localization system is less than that of anchor nodes, each target node may send a signal. When a quantity of target nodes that need to be localized in the localization system is greater than that of anchor nodes, the plurality of anchor nodes may send signals. In this way, the quantity of signal sending times can be further reduced. Two embodiments are separately described below.

Figure 3:
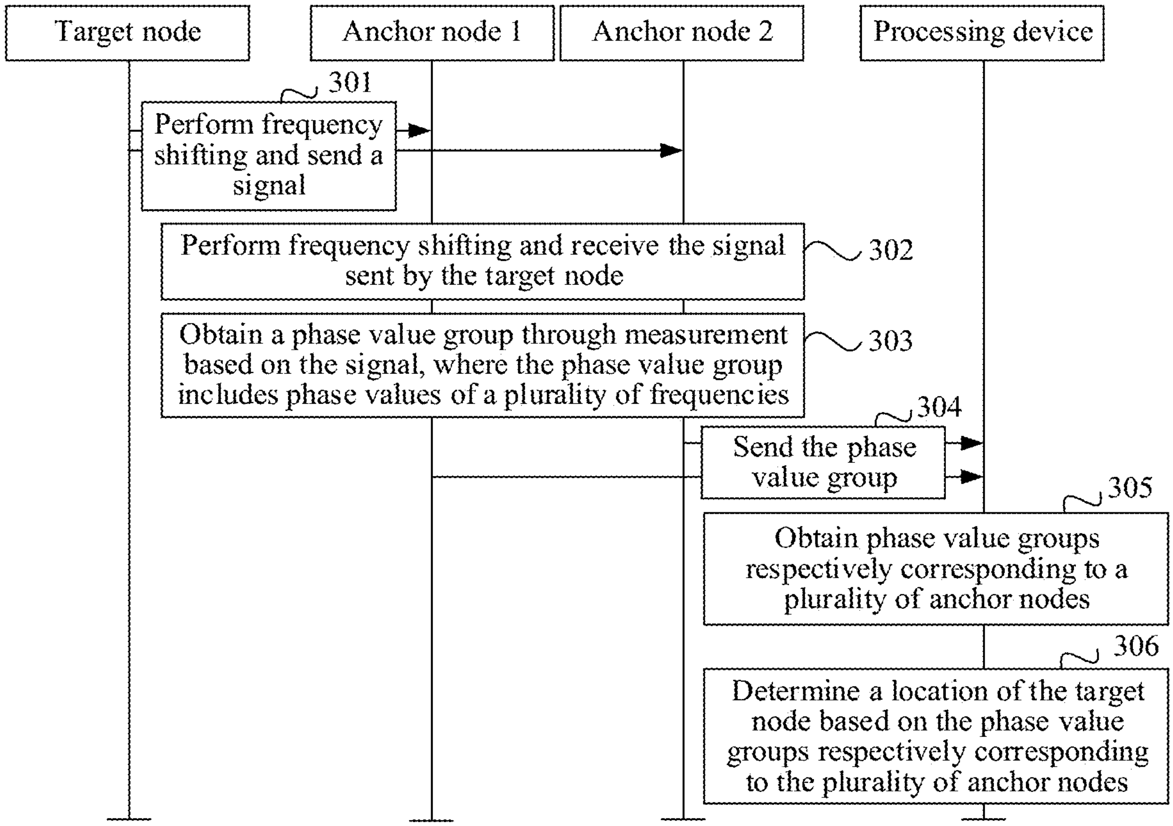
FIG. 3 is a schematic flowchart of a localization method according to an embodiment of this application.

For the first localization manner, an embodiment of this application provides a localization method. FIG. 3 is a schematic flowchart of a localization method according to an embodiment of this application. The method may be applied to a node and a device in the foregoing localization system. For example, the method may be applied to one target node, a plurality of anchor nodes, and a processing device in the foregoing communication system. In FIG. 3, the localization method is described by using one target node, two anchor nodes b1 and b2, and a processing device as an example. The method may include the following process.

301: The target node performs frequency shifting and sends a signal.

The target node may perform the frequency shifting based on a first frequency shifting curve and continuously send the signal. For example, the target node may separately shift a frequency to a plurality of frequencies based on the first frequency shifting curve, and continuously send the signal. A manner of sending the signal may be broadcast. The first frequency shifting curve is a curve in which a frequency changes with time, and shows a plurality of frequencies and a time period corresponding to each frequency. The target node may determine first curve information, and then determine the first frequency shifting curve based on the first curve information. The first curve information includes at least one of the following: a start moment of the first frequency shifting curve, the plurality of frequencies, an end moment of each frequency in the plurality of frequencies, a time period of each frequency in the plurality of frequencies, and duration of each frequency in the plurality of frequencies. The first curve information may be determined and sent to the target node by the processing device.

Optionally, the first curve information may include a start moment of the first frequency shifting curve, the plurality of frequencies, and at least one of the following: an end moment of each frequency in the plurality of frequencies, a time period of each frequency in the plurality of frequencies, and duration of each frequency in the plurality of frequencies. The plurality of frequencies are arranged in a time sequence, and values of the plurality of frequencies may be arranged in ascending, descending, or random order. This is not limited in this embodiment of this application.

That the target node performs frequency shifting based on the first frequency shifting curve means that the target node sequentially changes an LO frequency to a plurality of frequencies based on the first frequency shifting curve, and continuously sends a signal in an entire frequency shifting process. When the target node shifts a frequency from one frequency to a next adjacent frequency, a phase lock loop (PLL) of the target node is in a non-lock-loss state, to ensure continuity of an LO phase of the target node when the LO frequency changes, so that the LO phase does not suddenly change when the LO frequency changes.

There may be a plurality of curve shapes when a frequency changes from one frequency to a next adjacent frequency in the first frequency shifting curve. That is, when the frequency of the target node changes from one frequency to the next adjacent frequency, there may be a plurality of change manners. For example, when a frequency changes from one frequency to a next adjacent frequency in the first frequency shifting curve, a shape of the curve is a straight line perpendicular to a horizontal axis. In this case, the frequency of the target node jumps from the one frequency to the next adjacent frequency. Alternatively, when a frequency changes from one frequency to a next adjacent frequency in the first frequency shifting curve, a shape of the curve is a straight line that is not perpendicular to a horizontal axis. In this case, the frequency of the target node gradually changes from the one frequency to the next adjacent frequency.

Figure 4:
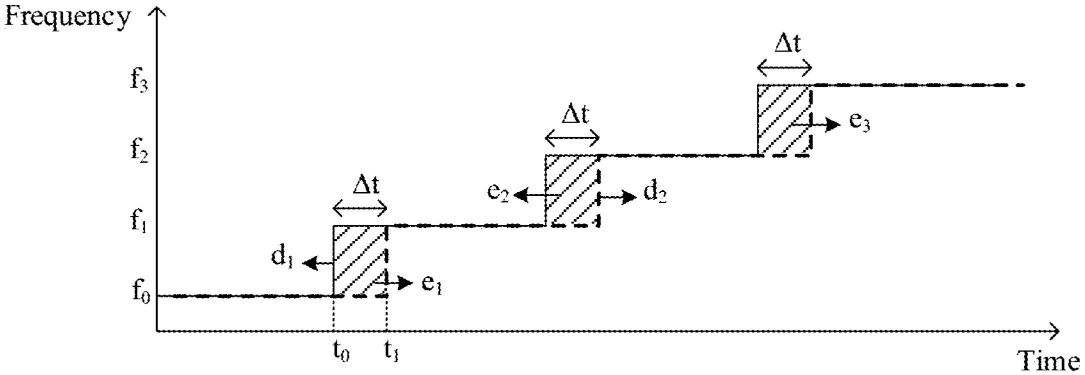
FIG. 4 is a schematic diagram of a frequency shifting curve according to an embodiment of this application.

For example, FIG. 4 is a schematic diagram of a frequency shifting curve according to an embodiment of this application. A horizontal axis represents time, and a vertical axis represents frequency. FIG. 4 shows a first frequency shifting curve $d_1$ (represented by a solid line) of a target node. A plurality of frequencies include four frequencies $f_0$ to $f_3$. When a frequency changes from one frequency to a next adjacent frequency in $d_1$, a shape of the curve is a straight line perpendicular to the horizontal axis, and a frequency interval between each two adjacent frequencies is $\Delta f$.

Figure 5:
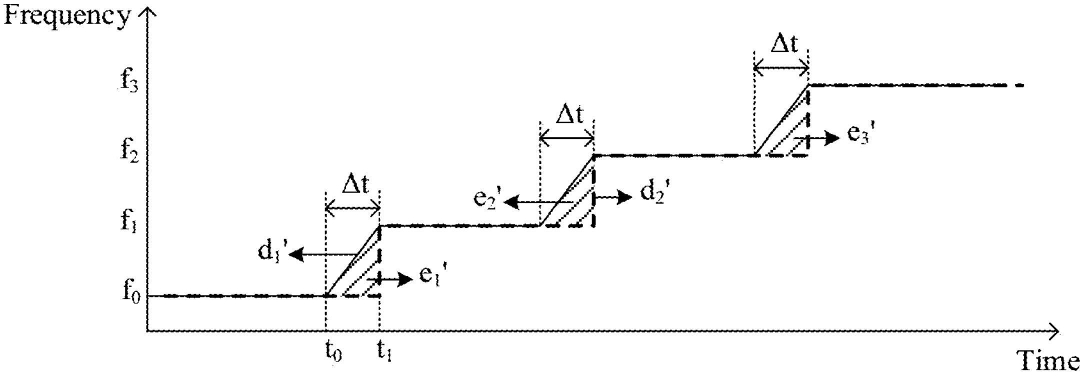
FIG. 5 is a schematic diagram of another frequency shifting curve according to an embodiment of this application.

FIG. 5 is a schematic diagram of another frequency shifting curve according to an embodiment of this application. FIG. 5 shows a first frequency shifting curve $d_1'$ (represented by a solid line) of a target node. A plurality of frequencies include four frequencies $f_0$ to $f_3$. When a frequency changes from one frequency to a next adjacent frequency in $d_1'$, a shape of the curve is a straight line that is not perpendicular to the horizontal axis.

302: The anchor node performs frequency shifting and receives the signal sent by the target node.

The anchor node may perform the frequency shifting based on the second frequency shifting curve and continuously receive the signal. For example, the anchor node may shift a frequency to a plurality of frequencies based on the second frequency shifting curve, and continuously receive the signal sent by the target node. For the second frequency shifting curve, refer to the first frequency shifting curve in 301. Details are not described in this embodiment of this application. The anchor node may determine second curve information, and then determine the second frequency shifting curve based on the second curve information. For both the second curve information and a process of determining the second frequency shifting curve based on the second curve information, refer to 301. Details are not described in this embodiment of this application.

That the anchor node performs frequency shifting based on the second frequency shifting curve means that the anchor node sequentially changes an LO frequency to a plurality of frequencies based on the second frequency shifting curve, and continuously receives a signal in an entire frequency shifting process. When the anchor node shifts a frequency from one frequency to a next adjacent frequency, a PLL of the anchor node is in a non-lock-loss state, so that an LO phase does not suddenly change when the LO frequency changes.

For a curve shape when a frequency changes from one frequency to a next adjacent frequency in the second frequency shifting curve of the anchor node, refer to 301. Details are not described in this embodiment of this application.

The second curve information may be determined by the processing device and sent to the anchor node. When the second curve information includes a start moment of the second frequency shifting curve, in an implementation, the start moment of the second frequency shifting curve may be determined by the processing device and sent to the anchor node. In another implementation, the start moment of the second frequency shifting curve may be determined by the anchor node. For example, the target node may send indication information to the anchor node, where the indication information indicates a duration interval. The anchor node determines the start moment of the second frequency shifting curve based on a moment at which the indication information is received and the duration interval.

Optionally, the anchor node may determine a moment that delays the duration interval after the moment at which the indication information is received as the start moment of the second frequency shifting curve. The target node may first determine the start moment of the first frequency shifting curve of the target node, and then determine the duration interval based on the start moment of the first frequency shifting curve. For example, the target node may determine an interval between the start moment of the first frequency shifting curve and a moment at which the target node sends the indication information as the duration interval. In this way, a difference between the start moment of the second frequency shifting curve of the anchor node and the start moment of the first frequency shifting curve of the target node can be small, to avoid impact of an excessively large difference on localization accuracy. The duration interval may alternatively be a preset value in the target node. A manner of determining the duration interval by the target node is not limited in this embodiment of this application.

It should be noted that for a plurality of anchor nodes (for example, the anchor nodes b1 and b2 shown in FIG. 3) in the localization system, each anchor node needs to perform a process performed by the foregoing anchor node. Further, after each anchor node determines the start moment of the second frequency shifting curve based on the moment at which the indication information is received and the duration interval, each anchor node may send the determined start moment of the second frequency shifting curve to the processing device. The processing device determines a target moment based on a plurality of moments sent by the plurality of anchor nodes. Next, the processing device sends the target moment to each anchor node, and each anchor node updates the start moment of the second frequency shifting curve determined by the anchor node to the received target moment. In this way, start moments determined by the plurality of anchor nodes can be exactly the same.

The processing device may determine any one start moment of the plurality of start moments as the target moment. Alternatively, the processing device may perform data processing on the plurality of moments to obtain the target moment. The data processing includes at least one of the following: calculating an average value, calculating a median, calculating a common, and the like. A manner of determining the target moment by the processing device is not limited in this embodiment of this application.

Duration of a frequency in the second frequency shifting curve of the anchor node is the same as duration of the same frequency in the first frequency shifting curve of the target node. A frequency interval between each two adjacent frequencies in the plurality of frequencies may be fixed or variable, and durations of any two frequencies may be the same or different, provided that duration of a frequency in the second frequency shifting curve of the anchor node is the same as duration of the same frequency in the first frequency shifting curve of the target node. This is not limited in this embodiment of this application.

It should be further noted that if the second frequency shifting curve of the anchor node and the first frequency shifting curve of the target node are placed in a same coordinate system, the second frequency shifting curve of the anchor node and the first frequency shifting curve of the target node usually cannot overlap. A reason why the second frequency shifting curve of the anchor node and the first frequency shifting curve of the target node cannot overlap includes: the start moment of the second frequency shifting curve of the anchor node and the start moment of the first frequency shifting curve of the target node are different, and/or in a time period in which a frequency is shifted from one frequency to a next frequency, a shape of the second frequency shifting curve of the anchor node and a shape of the first frequency shifting curve of the target node are different in the time period.

For example, as shown in FIG. 4 and FIG. 5, FIG. 4 further shows a second frequency shifting curve $d_2$ (represented by a dashed line) of the anchor node, and FIG. 5 further shows a second frequency shifting curve $d_2'$ (represented by a solid line) of the anchor node. A same frequency in $d_2$ and $d_1$ has same durations and different start moments. In addition, in a time period in which a frequency is shifted from one frequency to a next frequency, shapes of $d_2$ and $d_1$ in the time period are different, that is, $d_2$ and $d_1$ cannot overlap. A same frequency in $d_2'$ and $d_1'$ has same durations and different start moments. In addition, in a time period in which a frequency is shifted from one frequency to a next frequency, shapes of $d_2'$ and $d_1'$ in the time period are the same, that is, $d_2'$ and $d_1'$ cannot overlap.

303: The anchor node obtains a phase value group through measurement based on the signal, where the phase value group includes phase values of a plurality of frequencies.

The plurality of frequencies include at least one target frequency, and a quantity of target frequencies may be less than or equal to a quantity of the plurality of frequencies. The anchor node may obtain, based on the signal, a phase value of the target frequency through measurement at a plurality of moments of a time period that the target frequency is in, and obtain, based on the signal, a phase value of a non-target frequency through measurement at at least one moment of a time period that the non-target frequency is in. The non-target frequency is a frequency other than the target frequency among the plurality of frequencies.

It should be noted that for a plurality of anchor nodes (for example, the anchor nodes b1 and b2 shown in FIG. 3) in the localization system, each anchor node needs to perform a process needed to be performed by the foregoing anchor node. For related descriptions of each anchor node, refer to the foregoing descriptions. Details are not described in this embodiment of this application.

304: The anchor node sends the phase value group to the processing device.

For a plurality of anchor nodes (for example, the anchor nodes b1 and b2 shown in FIG. 3) in the localization system, each anchor node needs to send the phase value group obtained through measurement to the processing device.

305: The processing device obtains phase value groups respectively corresponding to the plurality of anchor nodes.

306: The processing device determines a location of the target node based on the phase value groups respectively corresponding to the plurality of anchor nodes.

It is assumed that the LO phase of the target node is $\varphi_T$, and the LO phase of the anchor node is $\varphi_A$. It can be learned from the foregoing description that a phase value of a frequency $f_k$ obtained by the anchor node through measurement is $\varphi_k=\varphi_T-\varphi_A-\varphi_{DK}$, where $\varphi_{DK}=(Dfk/c)*2\pi \bmod 2\pi$, and indicates a phase lag caused by a distance when the signal is transmitted from the target node to the anchor node, that is, indicates that a phase value of the signal at the frequency $f_k$ corresponding to the anchor node lags behind a phase value of the signal at the frequency $f_k$ corresponding to the sending node at a same time. When the second frequency shifting curve of the anchor node and the first frequency shifting curve of the target node cannot overlap in a same coordinate system, the non-overlapping part may affect a phase value obtained by the anchor node through measurement. For example, if a variation of the impact of the non-overlapping part on the phase value of the frequency $f_k$ that is obtained by the anchor node through measurement is represented as $\varphi_{\Delta k}$, the following formula may be obtained:

$$\varphi_k = \varphi_T - \varphi_A - (Df_k/c) * 2\pi \bmod 2\pi + \varphi_{\Delta k}$$

In a same coordinate system, $\varphi_{\Delta k}$ may be considered as an area enclosed by the horizontal axis and the non-overlapping part of the second frequency shifting curve of the anchor node and the first frequency shifting curve of the target node before a moment at which the anchor node measures the phase value of the frequency $f_k$. A calculation formula of $\varphi_{\Delta k}$ is as follows:

$$\varphi_{\Delta k} = \int_{t=t_0}^{t=t_k} [f_1(t) - f_2(t)f] \bullet dt$$

where $f_1(t)$ represents the first frequency shifting curve of the target node, $f_2(t)$ represents the second frequency shifting curve of the anchor node, $t_0$ represents the start moment of the first frequency shifting curve or the second frequency shifting curve, and $t_k$ represents the moment at which the anchor node measures the phase value of the frequency $f_k$.

For example, as shown in FIG. 4, the start moment of the first frequency shifting curve $d_1$ of the target node is $t_0$, the start moment of the second frequency shifting curve $d_2$ of the anchor node is $t_1$, and a difference between $t_1$ and $t_0$ is $\Delta t$.

Because duration of a frequency in $d_2$ is the same as duration of the same frequency in $d_1$, a difference $\Delta t$ between end moments of frequencies in the second frequency shifting curve of the anchor node and the first frequency shifting curve of the target node is the same. $\varphi_{\Delta k}$ may be considered as an area of at least one region of regions $e_1$ to $e_3$ in FIG. 4, so $\varphi_{\Delta K}=2\pi k\Delta t\Delta f$, $k\in\{0, 1, 2, 3\}$. Therefore, the following formula may be obtained:

$$\varphi_k = \varphi_T - \varphi_A - (Df_k/c)*2\pi \bmod 2\pi + 2\pi k\Delta t\Delta f$$

As shown in FIG. 5, the start moment of the first frequency shifting curve $d_1'$ of the target node is to, the start moment of the second frequency shifting curve $d_2'$ of the anchor node is $t_1$, and a difference between $t_1$ and to is $\Delta t$. Because duration of a frequency in $d_2'$ is the same as duration of the same frequency in $d_1'$, a difference $\Delta t$ between end moments of frequencies in the second frequency shifting curve of the anchor node and the first frequency shifting curve of the target node is the same. $\varphi_{\Delta k}$ may be considered as an area of at least one region of regions $e_1'$ to $e_3'$ in FIG. 5, so $\varphi_{\Delta k}=k\Delta t\Delta f$, $k\in\{0, 1, 2, 3\}$. Therefore, the following formula may be obtained:

$$\varphi_k = \varphi_T - \varphi_A - (Df_k/c)*2\pi \bmod 2\pi + \pi k\Delta t\Delta f$$

Optionally, $\varphi_{\Delta k}$ of the plurality of anchor nodes may be the same, the plurality of anchor nodes form at least one anchor node group, and the anchor node group includes two anchor nodes. The processing device may separately perform difference processing on phase values of a same frequency corresponding to two anchor nodes in each anchor node group, to obtain a phase difference between a plurality of frequencies corresponding to each anchor node group. In addition, a distance difference between the two anchor nodes in each anchor node group and the target node is obtained based on a phase difference between the plurality of frequencies corresponding to each anchor node group. Next, the location of the target node is determined by using distance differences respectively corresponding to the at least one anchor node group. The phase difference corresponding to each anchor node group includes a plurality of phase differences that are in a one-to-one correspondence with the plurality of frequencies.

The processing device may perform difference calculation on the phase values of a same frequency corresponding to the two anchor nodes in each anchor node group, to obtain a phase difference between the plurality of frequencies corresponding to each anchor node group. Because a third partial $\varphi_{\Delta k}$ of the plurality of anchor nodes is the same, a difference between the phase values of a same frequency corresponding to the two anchor nodes in each anchor node group can cancel $\varphi_{\Delta k}$, so that impact of Oak on a localization result is eliminated.

Figure 6:
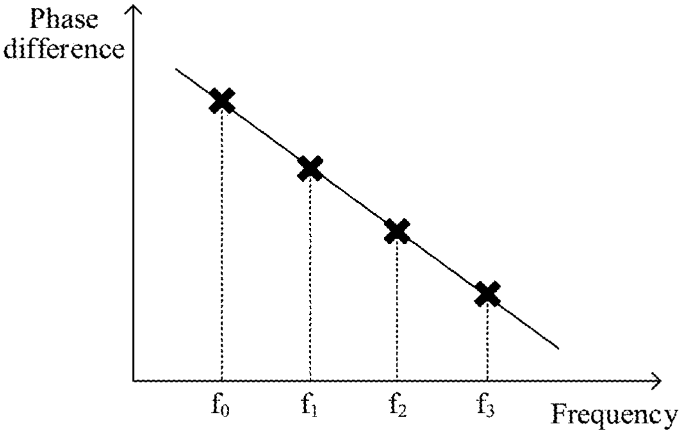
FIG. 6 is a schematic diagram of a change in a plurality of phase differences of an anchor node group with frequency according to an embodiment of this application.

After the phase difference between the plurality of frequencies corresponding to each anchor node group is obtained, the distance difference between the two anchor nodes in the anchor node group and the target node may be determined based on a slope of a change in the phase difference between the plurality of frequencies corresponding to the anchor node group with frequency. The plurality of frequencies can improve accuracy of the determined slope, thereby improving accuracy of the determined distance difference, and implementing precise localization of the target node. For example, FIG. 6 is a schematic diagram of a change in a plurality of phase differences of an anchor node group with frequency according to an embodiment of this application. A horizontal axis represents a frequency, a vertical axis represents a phase difference between a plurality of frequencies, and four identification points respectively represent phase differences of two anchor nodes in the anchor node group at four frequencies $f_0$ to $f_3$. A slope of a curve shown in FIG. 6 is a function of a difference $\Delta D$ between distances between the two anchor nodes and a target node.

Further, a location of the target node may be determined in a time difference of arrival (TDOA) manner through a distance difference (that is, a distance difference between two anchor nodes in each anchor node group and the target node) corresponding to at least one anchor node group. For example, the distance difference between the two anchor nodes in each anchor node group and the target node may be used to obtain a plurality of hyperbolas that use the target node as a focus and use the distance difference as a major axis. An intersection point of the plurality of hyperbolas is the location of the target node.

For example, the two anchor nodes $b_1$ and $b_2$ shown in FIG. 3 are used as an example. LO phases of $b_1$ and $b_2$ are respectively $\varphi_{b1}$ and $\varphi_{b2}$, and a phase value Oki of the frequency $f_k$ measured by $b_1$ is:

$$\varphi_{k1} = \varphi_T - \varphi_{b1} - (D_1 f_k/c)*2\pi \bmod 2\pi + \varphi_{\Delta k}$$

A phase value $\varphi_{k2}$ of the frequency $f_k$ measured by $b_2$ is:

$$\varphi_{k2} = \varphi_T - \varphi_{b2} - (D_2 f_k/c)*2\pi \bmod 2\pi + \varphi_{\Delta k}$$

A difference $\Delta\varphi_k$ between the phase values of the same frequency $f_k$ corresponding to $b_1$ and $b_2$ is:

$$\Delta\varphi_k = \varphi_{b1} - \varphi_{b2} - (\Delta Df_k/c)*2\pi \bmod 2\pi$$

A slope of a change in $\Delta\varphi_k$ with frequency is $(\Delta D/c)*2\pi \bmod 2\pi$. After the slope of the change in $\Delta\varphi_k$ with frequency is obtained, $\Delta D$ can be obtained based on the slope.

In this embodiment of this application, all the plurality of anchor nodes perform frequency shifting based on the second frequency shifting curves, so that start moments of second frequency shifting curves of the plurality of anchor nodes are the same. In this way, first frequency shifting curves of a plurality of anchor nodes in a same coordinate system may overlap, so that $\varphi_{\Delta k}$ of the plurality of anchor nodes is the same. When a plurality of anchor nodes have a same frequency shifting capability and a same frequency shifting manner, and clocks of the plurality of anchor nodes are synchronized, all the plurality of anchor nodes can perform frequency shifting based on second frequency shifting curves, and start moments of second frequency shifting curves of the plurality of anchor nodes are the same.

The processing device may send synchronization information to the plurality of anchor nodes. The synchronization information is used to synchronize clocks of the plurality of anchor nodes. The plurality of anchor nodes may separately perform, based on the second frequency shifting curves, frequency shifting based on the synchronized clock and continuously receive the signal. In this way, the start moments of the second frequency shifting curves of the plurality of anchor nodes may be the same. In an example, the processing device may send the synchronization information, to continuously synchronize the clocks of the plurality of anchor nodes in a frequency shifting process of the plurality of anchor nodes, so that the clocks of the plurality of anchor nodes are completely synchronized in the frequency shifting process. For example, the synchronization information may include a unified external clock (for example, an external clock), so that the clocks of the plurality of anchor nodes are continuously synchronized in the frequency shifting process. The frequency shifting process is a time period between an earliest moment and a latest moment in the second frequency shifting curves of the plurality of anchor nodes.

In another example, the processing device may send the synchronization information, to synchronize the clocks of the plurality of anchor nodes before the plurality of anchor nodes start to perform frequency shifting and receive the signal, and synchronize the clocks of the plurality of anchor nodes to the start moments of the second frequency shifting curves of the plurality of anchor nodes, so that the start moments of the second frequency shifting curves of the plurality of anchor nodes are consistent.

Optionally, the synchronization information may include a pulse signal. The processing device may be connected to the plurality of anchor node through cables. Before the plurality of anchor nodes start to perform frequency shifting and receive the signal, the processing device broadcasts the pulse signal at a preset period until reaching the start moments of the second frequency shifting curves of the plurality of anchor nodes. Each anchor node adjusts an internal clock based on the received pulse signal, so that a change frequency of the internal clock is synchronized with a change frequency of the pulse signal, thereby implementing internal clock synchronization of the plurality of anchor nodes. Line lengths between the processing device and the plurality of anchor nodes may be equal. In this way, accuracy of the internal clock synchronization can be improved, and accuracy of subsequent target node localization can be improved.

For example, the processing device and each anchor node may pre-agree that there is an interval of n clock ticks between two pulses, where n>0. If internal clock ticks of an anchor node between two consecutive pulse signals is not equal to n, the clock tick needs to be adjusted. For example, if internal clock ticks of an anchor node between two consecutive pulse signals is n+1, it indicates that an internal clock of the anchor node is too fast, and the internal clock needs to be reduced by one clock tick. If internal clock ticks of an anchor node between two consecutive pulse signals is n−1, it indicates that an internal clock of the anchor node is too slow, and the internal clock needs to be increased by one clock tick.

It should be noted that for a manner in which the processing device is connected to the plurality of anchor nodes through cables to perform synchronization in the foregoing example, when the cable lengths between the processing device and the anchor nodes are not equal, durations in which the pulse signal arrives at the anchor nodes are not equal. As a result, clocks of the anchor nodes are not synchronized. In this case, the processing device may separately perform cable length compensation on phase values in a phase value group obtained by each anchor node through measurement, and determine the location of the target node based on the phase value groups respectively corresponding to the plurality of anchor nodes obtained after cable length compensation is performed, to cancel inconsistency of Ow in phase values, caused by different cable lengths, of a same frequency corresponding to the plurality of anchor nodes.

The processing device may determine, based on a known cable length, a difference between moments at which the pulse signal arrives at the anchor nodes (that is, a difference between start moments of frequency shifting curves of the anchor nodes), and then separately perform, based on the moment difference, cable length compensation on the phase values in the phase value group obtained by each anchor node through measurement.

For example, the processing device may determine one reference anchor node in the plurality of anchor nodes, and determine a difference $\Delta t'$ between a moment at which the pulse signal arrives at a non-reference anchor node and a moment at which the pulse signal arrives at the reference anchor node. In this case, a difference between a start moment of the second frequency shifting curve of the non-reference anchor node and a start moment of the second frequency shifting curve of the reference anchor node is $\Delta t'$, and a difference between the phase value of the frequency $f_k$ measured by the non-reference anchor node and the phase value of the frequency $f_k$ measured by the reference anchor node is $\varphi_{\Delta t'}$. Then, $\varphi_{\Delta t'}$ may be subtracted from the phase value of the frequency $f_k$ measured by the non-reference anchor node, that is, $\varphi_{\Delta t'}=2\pi(f_k-f_0)\Delta t'$.

For example, it is assumed that a cable length between the processing device and the reference anchor node is one meter, a cable length between the processing device and the non-reference anchor node is 11 meters, and a pulse signal arrives at the non-reference anchor node by 10 meters more than arrives at the reference anchor node. In this case, the difference between the moment at which the pulse signal arrives at the non-reference anchor node and the moment at which the pulse signal arrives at the reference anchor node is $\Delta t'=10/v$ seconds, where v represents a speed of the signal in the cable, and is measured in m/s. That is, a clock of the non-reference anchor node is $\Delta t'=10/v$ seconds later than a clock of the reference anchor node. Therefore, the phase value of the frequency $f_k$ measured by the non-reference anchor node is $\varphi_{\Delta t'}=20\pi(f_k-f_0)/v$ greater than that measured by the reference anchor node, and the processing device may subtract $\varphi_{\Delta t'}$ from the phase value of the frequency $f_k$ measured by the non-reference anchor node, to perform cable length compensation on the phase value of the frequency $f_k$ measured by the non-reference anchor node.

Further, in an implementation in which the processing device synchronizes the clocks of the plurality of anchor nodes to ensure that the start moments of the second frequency shifting curves of the plurality of anchor nodes are consistent, because the plurality of anchor nodes are not continuously synchronized in the frequency shifting process in the synchronization manner, the clocks of the plurality of anchor nodes may be not synchronized in the frequency shifting process. As a result, end moments of frequencies in the second frequency shifting curves of the plurality of anchor nodes are different, and $\varphi_{\Delta k}$ in the phase values of a same frequency corresponding to the plurality of anchor nodes are inconsistent. A reason why the clocks of the plurality of anchor nodes are not synchronized in the frequency shifting process is that there is an error in crystal oscillators of the plurality of anchor nodes. As a result, the clocks of the plurality of anchor nodes have clock drift, that is, the clocks of the plurality of anchor nodes have different forward speeds.

For example, it is assumed that start moments of second frequency shifting curves of the anchor node $b_1$ and the anchor node $b_2$ are both t=0, and a clock speed of the anchor node $b_1$ is high. When an end moment of a first frequency is reached, because of clock drift, the anchor node $b_1$ starts to shift the frequency to a second frequency at $t_1$, and the anchor node $b_2$ starts to shift the frequency to the second frequency at $1.01t_1$, with a difference of $0.01t_1$. When an end moment of the second frequency is reached, because of clock drift, the anchor node $b_1$ starts to shift the frequency to the second frequency at $t_2$, the anchor node $b_2$ starts to shift the frequency to the second frequency at $1.01t_2$, with a difference of $0.01t_2$, and so on. It can be learned from this that there is a difference between end moments of a frequency of the plurality of anchor nodes, that is, the plurality of anchor nodes do not all use the second frequency shifting curve. In this case, the processing device may separately perform clock compensation on the phase values in the phase value group obtained by each anchor node through measurement, to cancel inconsistency of $\varphi_{\Delta k}$ in the phase values of a same frequency of the plurality of anchor nodes caused by clock asynchronization.

Optionally, a frequency offset may be determined based on a phase value group corresponding to each anchor node, and clock compensation is separately performed, through the frequency offset, on the phase values in the phase value group obtained by each anchor node through measurement. Then, the location of the target node is determined based on the phase value groups respectively corresponding to the plurality of anchor nodes obtained after clock compensation is performed. The frequency offset refers to an actual difference value of a same frequency of the plurality of anchor nodes, and the difference value is generated due to a difference between LO hardware of the plurality of anchor nodes. For example, it is assumed that the frequencies of both the anchor node $b_1$ and the anchor node $b_2$ are shifted to a frequency $f_0$, and an actual frequency of the anchor node $b_1$ is $f_0$. However, the actual frequency of the anchor node $b_2$ may be $f_0$+frequency offset ($f_{offset}$), that is, the actual frequency of the anchor node $b_2$ is $f_{offset}$ greater than that of the anchor node $b_1$. It should be noted that the start moments of the second frequency shifting curves of the plurality of anchor nodes are the same. Therefore, a clock offset does not affect the phase value of the first frequency corresponding to each anchor node, and clock compensation does not need to be performed on the phase value of the first frequency.

Optionally, the processing device may determine the frequency offset of the anchor node at the target frequency based on the phase value of the target frequency corresponding to the anchor node. It can be learned from the foregoing description that there is at least one target frequency, and the phase value of the target frequency is obtained through measurement by the anchor node at the plurality of moments in the time period that the target frequency is in. When there is one target frequency, the processing device may directly determine the frequency offset based on phase values obtained through measurement by the anchor node at a plurality of moments in a time period that the one target frequency is in. When there are a plurality of target frequencies, the processing device may determine the frequency offset of the target frequency based on phase values obtained through measurement by the anchor node at a plurality of moments of the target frequency.

For any target frequency, a frequency offset at the any target frequency may be determined based on a relationship of a change in phase values obtained through measurement by the anchor node at a plurality of moments of a time period that the any target frequency is in with the plurality of moments. For example, a slope of the change in phase values obtained through measurement by the anchor node at the plurality of moments of the time period that the any target frequency is in with the plurality of moments may be determined, and then a ratio of the slope of the change to 2π is determined as the frequency offset at the any target frequency. For example, it is assumed that phase values obtained through measurement by the anchor node based on the received signal at two moments $t_0$ and $t_1$ of the time period that the any target frequency is in are respectively $\varphi_0$ and $\varphi_1$, the frequency offset at the any target frequency is $f_{offset}=(\varphi_1-\varphi_0)/(t_1-t_0)$.

During clock compensation, the processing device may determine a ratio of the frequency offset of the target frequency to the target frequency, and then separately perform, based on the start moment of the second frequency shifting curve of the anchor node and the ratio, clock compensation on the phase values in the phase value group obtained by the anchor node through measurement. The ratio indicates a clock drift rate of the anchor node, whose fractional unit is point per million (PPM). When ambient temperature remains unchanged, the clock drift rate is usually fixed. Therefore, when there are a plurality of target frequencies, ratios of frequency offsets of the plurality of target frequencies to the target frequencies are the same. In this case, when there is one target frequency, the processing device may directly perform clock compensation based on the ratio of the frequency offset of the target frequency to the target frequency. When there are a plurality of target frequencies, the processing device may perform clock compensation based on a ratio of a frequency offset of any target frequency to the target frequency.

For example, clock compensation is performed on a phase value $\varphi_k$ of a frequency $f_k$ corresponding to an anchor node. It is assumed that a start moment of $f_k$ is $t_k$, a ratio is PPM, the start moment of the second frequency shifting curve is $t_0$ (that is, a start moment of a frequency $f_0$), and a moment error caused by clock drift is $\Delta t'=PPM(t_k-t_0)$. A phase compensation value for clock compensation on $\varphi_k$ is a sum of a product of Δt', 2π, and PPM and a phase compensation value of each frequency before $f_k$. The value is expressed as 2πPPM $$[(f_k-f_{k-1})(t_3-t_0)+(f_{k-1}-f_{k-2})(t_3-t_0)+\ldots+(f_1-f_0)(t_1-t_0)].$$

For example, clock compensation is performed on a phase value $\varphi_3$ of a frequency $f_3$ corresponding to the anchor node. It is assumed that the determined ratio is 2 PPM, and a moment error caused by clock drift is $\Delta t'=2PPM(t_3-t_0)$. A phase compensation value for clock compensation performed on $\varphi_3$ is $4\pi PPM\ [(f_3-f_2)\ (t_3-t_0)+(f_2-f_1)\ (t_2-t_0)+(f_1-f_0)\ (t_1-t_0)]$, and the processing device may compensate the phase value of the frequency $f_3$ of the anchor node to $\varphi_3-4\pi PPM\ [(f_3-f_2)\ (t_3-t_0)+(f_2-f_1)\ (t_2-t_0)+(f_1-f_0)\ (t_1-t_0)]$.

It should be noted that when a radio frequency (RF) signal (that is, the LO signal) of the anchor node and the internal clock of the anchor node are from a same source (that is, from a same crystal oscillator), clock compensation may be separately performed, in the foregoing manner of performing clock compensation on the anchor node through the frequency offset, on the phase values in the phase value group obtained by the anchor node through measurement.

In addition, a frequency offset existing between the plurality of anchor nodes causes inconsistency of Pak in phase values of a same frequency corresponding to the plurality of anchor nodes. In this case, the processing device may separately perform, based on the frequency offset of the anchor node at the target frequency, frequency offset compensation on the phase values in the phase value group obtained by the anchor node through measurement, and determine the location of the target node based on the phase value groups respectively corresponding to the plurality of anchor nodes obtained after frequency offset compensation is performed, to cancel inconsistency of Ok in phase values of a same frequency of the plurality of anchor nodes caused by the frequency offset.

The phase value group corresponding to the anchor node is obtained through measurement by the anchor node at the plurality of measurement moments. The processing device may determine the reference moment in the plurality of measurement moments, and then separately perform, based on the reference moment and the frequency offset of the target frequency, frequency offset compensation on the phase values in the phase value group obtained by the anchor node through measurement. The reference moment may be an earliest moment or any moment in the plurality of measurement moments. The reference moment is not limited in this embodiment of this application.

When there is one target frequency, the processing device may directly perform frequency offset compensation through the frequency offset of the target frequency. When there are a plurality of target frequencies, the processing device may determine one target frequency offset based on a plurality of frequency offsets of the plurality of target frequencies, and perform frequency offset compensation based on the target frequency offset; or directly perform frequency offset compensation through frequency offsets corresponding to the plurality of target frequencies.

Optionally, the processing device may determine any one of the frequency offsets respectively corresponding to the plurality of target frequencies as the target frequency offset, or determine an average value, a median, or a common of the frequency offsets respectively corresponding to the plurality of target frequencies as the target frequency offset. A manner of determining the target frequency offset by the processing device is not limited in this embodiment of this application.

When frequency offset compensation is performed through a frequency offset of a target frequency or a target frequency offset, for example, frequency offset compensation is performed on a phase value $\varphi_k$ of a frequency $f_k$ that is obtained through measurement by the anchor node at $t_k$, it is assumed that the determined frequency offset of the target frequency or the determined target frequency offset is $f_{offset}$, and the reference moment is $t_2$ (a moment at which the anchor node measures a phase value of the frequency $f_2$). A frequency offset compensation value for frequency offset compensation performed on ok is a product of $2\pi$, $t_k-t_2$, and $f_{offset}$, and is expressed as $2\pi f_{offset}(t_k-t_2)$. For example, frequency offset compensation is performed on a phase value $\varphi_3$ of a frequency $f_3$ that is obtained through measurement by the anchor node at $t_3$. A frequency offset compensation value for frequency offset compensation performed on $\varphi_3$ is $2\pi f_{offset}(t_3-t_0)$. For example, the processing device may compensate the phase value obtained through measurement by the anchor node at $t_3$ to $\varphi_3-2\pi f_{offset}(t_3-t_0)$.

Each frequency in the plurality of frequencies may be a target frequency. When frequency offset compensation is directly performed through frequency offsets respectively corresponding to the plurality of target frequencies, each frequency offset corresponds to a time period in the second frequency shifting curve. The time period corresponding to each frequency offset may be a duration period of a frequency corresponding to the frequency offset, or a time period between an end moment of a frequency corresponding to the frequency offset and an end moment of a previous adjacent frequency. The frequency offset compensation value for frequency offset compensation performed on $\varphi_k$ is a sum of products of time periods between $t_k$ and $t_0$, frequency offsets corresponding to the time periods, and $2\pi$.

For example, frequency offset compensation is performed on the phase value $\varphi_3$ of the frequency $f_3$ that is obtained through measurement by the anchor node at $t_3$. It is assumed that time periods between $t_3$ and to include $t_0$ to $t_1$, $t_1$ to $t_2$, and $t_2$ to $t_3$. A frequency offset corresponding to $t_0$ to $t_1$ is $f_{offset1}$, and a corresponding frequency is $f_1$. A frequency offset corresponding to $t_1$ to $t_2$ is $f_{offset2}$, and a corresponding frequency is $f_2$. A frequency offset corresponding to $t_2$ to $t_3$ is $f_{offset3}$, and a corresponding frequency is $f_3$. In this case, the processing device may compensate the phase value obtained through measurement by the anchor node at $t_3$ to $\varphi_3-2\pi[f_{offset1}(t_1-t_0)+f_{offset2}(t_2-t_1)+f_{offset3}(t_3-t_2)]$.

The foregoing embodiment shows three compensation manners (including cable length compensation, clock compensation, and frequency offset compensation) for the phase value groups respectively corresponding to the plurality of anchor nodes. After the phase value groups respectively corresponding to the plurality of anchor nodes are obtained, the phase values in the phase value groups respectively corresponding to the plurality of anchor nodes may be separately compensated in at least one manner of the foregoing three compensation manners.

In this embodiment, the target node separately shifts a frequency to a plurality of frequencies based on a frequency shifting curve, and broadcasts a signal, where a quantity of signal sending times required for localizing a plurality of target nodes is equal to a quantity of target nodes. Compared with a conventional technology, when a quantity of anchor nodes is N, in this embodiment of this application, the quantity of signal sending times required for localizing a target node is reduced from 2N to 1.

In conclusion, in the localization method provided in this embodiment of this application, the target node performs frequency shifting and sends a signal, and each anchor node performs frequency shifting and receives the signal sent by the target node, obtains a phase value group through measurement based on the signal, and then sends the phase value group corresponding to the anchor node to a processing device. The processing device determines a location of the target node based on the phase value groups respectively corresponding to the plurality of anchor nodes. For the plurality of anchor nodes, the target node only needs to perform frequency shifting and send a signal once, to implement localization of the target node. This reduces the quantity of signal sending times required for localizing the target node, thereby reducing time consumption of a localization process, and improving localization efficiency and a refresh rate of the location of the target node. When the target node is in a moving state, accuracy of determining the location of the target node is high. In addition, power consumption of the target node is reduced, and a use time of the target node is increased. In addition, interference to another wireless device and interference caused by another wireless device are effectively reduced, and difficulty in scheduling performed by the target node for co-existence among different wireless technologies is reduced.

In addition, the target node may perform the frequency shifting based on a first frequency shifting curve and continuously send the signal, and the anchor node may perform the frequency shifting based on a second frequency shifting curve and continuously receive the signal. The first frequency shifting curve of the target node and the second frequency shifting curve of the anchor node usually cannot overlap, and the non-overlapping part may affect a phase value obtained by the anchor node through measurement, so that accuracy of localizing the target node is reduced. In this embodiment of this application, all the plurality of anchor nodes perform frequency shifting based on the second frequency shifting curves, and start moments of second frequency shifting curves of the plurality of anchor nodes are the same, so that areas of non-overlapping parts of the plurality of anchor nodes and the target node are the same. The areas of the non-overlapping parts may be canceled between the plurality of anchor nodes, to cancel impact of the non-overlapping parts on localization accuracy. This reduces the quantity of signal sending times, and eliminates impact of the difference on a localization result, thereby improving accuracy of the localization result.

Figure 7:
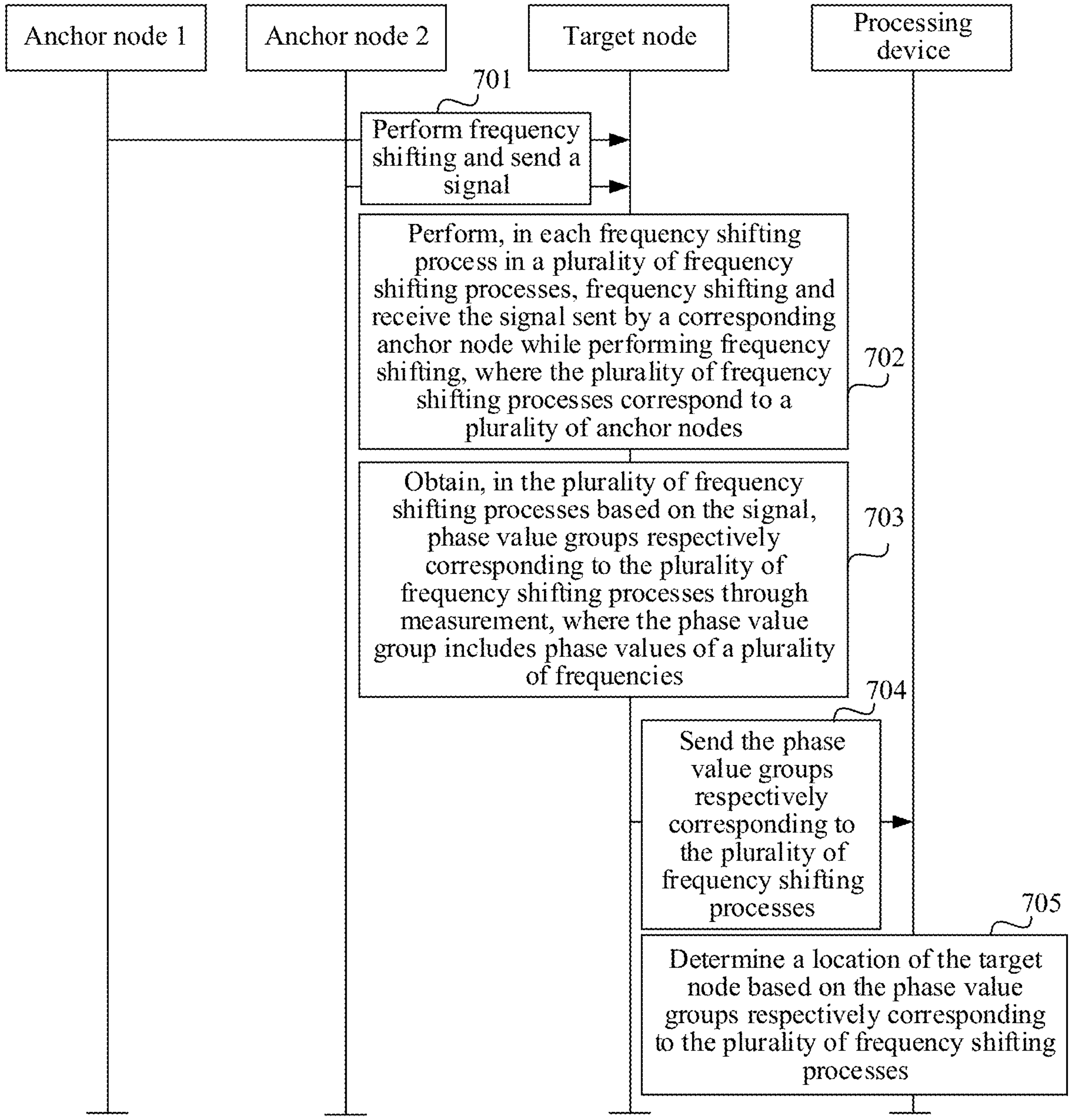
FIG. 7 is a schematic flowchart of another localization method according to an embodiment of this application.

For the second localization manner, an embodiment of this application provides a localization method. FIG. 7 is a schematic flowchart of another localization method according to an embodiment of this application. The method may be applied to a node and a device in the foregoing localization system. For example, the method may be applied to one target node, a plurality of anchor nodes, and a processing device in the foregoing communication system. In FIG. 7, the localization method is described by using one target node, two anchor nodes $b_1$ and $b_2$, and a processing device as an example. The method may include the following process.

701: The anchor node performs frequency shifting and sends a signal.

The anchor node may perform the frequency shifting based on a first frequency shifting curve and continuously send the signal. For example, the anchor node may separately shift a frequency to a plurality of frequencies based on the first frequency shifting curve, and continuously send the signal. A manner of sending the signal may be broadcast. The first frequency shifting curve is a curve in which a frequency changes with time. The anchor node may determine first curve information, and determine the first frequency shifting curve based on the first curve information. The first curve information includes at least one of the following: a start moment of the first frequency shifting curve, the plurality of frequencies, an end moment of each frequency in the plurality of frequencies, a time period of each frequency in the plurality of frequencies, and duration of each frequency in the plurality of frequencies. The first curve information may be determined and sent to the anchor node by the processing device. For related descriptions of the first curve information, the first frequency shifting curve, and the process 701, refer to the foregoing process 301. Details are not described in this embodiment of this application.

Optionally, the first curve information may include a start moment of the first frequency shifting curve, the plurality of frequencies, and at least one of the following: an end moment of each frequency in the plurality of frequencies, a time period of each frequency in the plurality of frequencies, and duration of each frequency in the plurality of frequencies.

It should be noted that for a plurality of anchor nodes (for example, the anchor nodes b1 and b2 shown in FIG. 7) in the localization system, each anchor node needs to perform a process performed by the foregoing anchor node.

The plurality of anchor nodes sequentially perform the frequency shifting based on the first frequency shifting curves and send the signal. Optionally, the plurality of anchor nodes may sequentially and separately perform frequency shifting based on the first frequency shifting curves and send signals in a time division multiple access (TDMA) manner. For a process in which each anchor node performs frequency shifting based on the first frequency shifting curve and sends the signal, refer to 301 in the foregoing first embodiment. Details are not described in this embodiment of this application.

702: The target node performs, in each frequency shifting process in a plurality of frequency shifting processes, frequency shifting and receives the signal sent by the corresponding anchor node while performing frequency shifting, where the plurality of frequency shifting processes correspond to the plurality of anchor nodes.

The target node may perform, in each frequency shifting process, frequency shifting based on a second frequency shifting curve corresponding to the frequency shifting process, and continuously receive the signal sent by the corresponding anchor node. For the second frequency shifting curve corresponding to each frequency shifting process, refer to 301. Details are not described in this embodiment of this application. The target node may determine second curve information and third curve information of each frequency shifting process in the plurality of frequency shifting processes, and then determine, based on the second curve information and the third curve information of each frequency shifting process, second frequency shifting curves respectively corresponding to the plurality of frequency shifting processes.

The second curve information includes at least one of the following: a start moment of the second frequency shifting curve corresponding to each frequency shifting process in the plurality of frequency shifting processes, a start moment of the second frequency shifting curve corresponding to a first frequency shifting process in the plurality of frequency shifting processes, and an interval between start moments of second frequency shifting curves corresponding to each two adjacent frequency shifting processes. The third curve information includes at least one of the following: a plurality of frequencies, an end moment of each frequency in the plurality of frequencies, a time period of each frequency in the plurality of frequencies, and duration of each frequency in the plurality of frequencies.

For example, the second curve information includes the start moment of the second frequency shifting curve corresponding to the first frequency shifting process and the interval between the start moments of the second frequency shifting curves corresponding to each two adjacent frequency shifting processes. The target node may determine, based on the start moment of the second frequency shifting curve corresponding to the first frequency shifting process and the interval between the start moments of the second frequency shifting curves corresponding to each two adjacent frequency shifting processes, the start moment of the second frequency shifting curve corresponding to each frequency shifting process.

The second curve information and the third curve information of each frequency shifting process may be determined by the processing device and sent to the target node. When the second curve information includes the start moment of the second frequency shifting curve corresponding to the first frequency shifting process in the plurality of frequency shifting processes, in an implementation, the start moment of the second frequency shifting curve corresponding to the first frequency shifting process may be determined by the processing device and sent to the target node. In another implementation, the start moment of the second frequency shifting curve corresponding to the first frequency shifting process may be determined by the target node. For example, the anchor node may send indication information to the target node, where the indication information indicates a duration interval. The target node determines, based on a moment at which the indication information is received and the duration interval, the start moment of the second frequency shifting curve corresponding to the first frequency shifting process.

For a process in which the target node determines, based on the moment at which the indication information is received and the duration interval, the start moment of the second frequency shifting curve corresponding to the first frequency shifting process of the target node, refer to the process in which the anchor node determines, based on the moment at which the indication information is received and the duration interval, the start moment of the second frequency shifting curve corresponding to the anchor node in 302 in the foregoing first embodiment. Details are not described in this embodiment of this application.

Optionally, the anchor node that sends the indication information may be an anchor node whose start moment of the first frequency shifting curve is earliest in the plurality of anchor nodes. The anchor node whose start moment of the first frequency shifting curve is earliest may first determine the start moment of the first frequency shifting curve, and then determine the duration interval based on the start moment of the first frequency shifting curve. For this process, refer to the process of determining the duration interval by the target node in 302 in the first embodiment. Details are not described in this embodiment of this application.

Duration of a frequency in the second frequency shifting curve corresponding to each frequency shifting process of the target node is the same as duration of the same frequency in the first frequency shifting curve of the corresponding anchor node. A frequency interval between each two adjacent frequencies in the plurality of frequencies may be fixed or variable, and durations of any two frequencies may be the same or different, provided that duration of a frequency in the second frequency shifting curve corresponding to each frequency shifting process of the target node is the same as duration of the same frequency in the first frequency shifting curve of the corresponding anchor node. This is not limited in this embodiment of this application.

When the target node shifts a frequency from one frequency to a next adjacent frequency in a frequency shifting process, a PLL of the target node is in a non-lock-loss state, so that an LO phase does not suddenly change when the LO frequency changes. After a frequency shifting process ends, the PLL of the target node may be in a lock-loss state or the non-lock-loss state. If the PLL is in the lock-loss state, the PLL needs to be re-locked before a start moment of a second frequency shifting curve corresponding to a next frequency shifting process. Further, after a frequency shifting process ends and before a next frequency shifting process starts, if the PLL of the target node is in the lock-loss state, LO phases of the target node in the two frequency shifting processes are different. If the PLL of the target node is in the non-lock-loss state, LO phases of the target node in the two frequency shifting processes are the same.

It should be noted that if the second frequency shifting curve corresponding to the frequency shifting process of the target node and the first frequency shifting curve of the corresponding anchor node are placed in a same coordinate system, the second frequency shifting curve corresponding to the frequency shifting process and the first frequency shifting curve of the corresponding anchor node usually cannot overlap. For a reason for not overlapping, refer to 302 in the first embodiment. Details are not described herein in this embodiment of this application.

Figure 8:
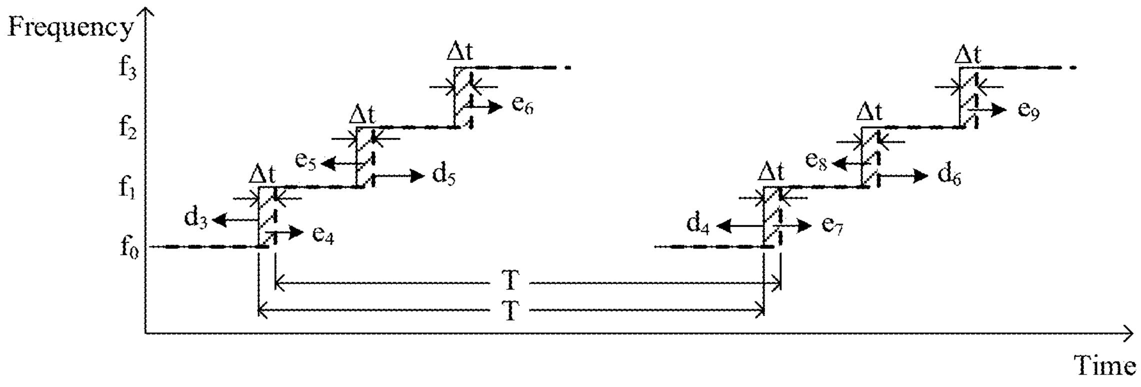
FIG. 8 is a schematic diagram of still another frequency shifting curve according to an embodiment of this application.

For example, FIG. 8 is a schematic diagram of still another frequency shifting curve according to an embodiment of this application. A horizontal axis represents time, and a vertical axis represents frequency. FIG. 8 shows second frequency shifting curves $d_3$ (represented by a solid line) and $d_4$ (represented by a solid line) corresponding to two frequency shifting processes, and first frequency shifting curves $d_5$ (represented by a dashed line) and do (represented by a dashed line) of two anchor nodes $b_1$ and $b_2$ corresponding to the two frequency shifting processes. A plurality of frequencies include four frequencies $f_0$ to $f_3$. When a frequency changes from one frequency to a next adjacent frequency in $d_3$ to $d_6$, a shape of the curve is a straight line perpendicular to the horizontal axis, and a frequency interval between each two adjacent frequencies is $\Delta f$.

A same frequency in $d_3$ and $d_5$ has same durations and different start moments. In addition, in a time period in which a frequency is shifted from one frequency to a next frequency, shapes of $d_3$ and $d_5$ in the time period are different, that is, $d_3$ and $d_5$ cannot overlap. A same frequency in $d_4$ and $d_6$ has same durations and different start moments. In addition, in a time period in which a frequency is shifted from one frequency to a next frequency, shapes of $d_4$ and do in the time period are different, that is, $d_4$ and $d_6$ cannot overlap.

Figure 9:
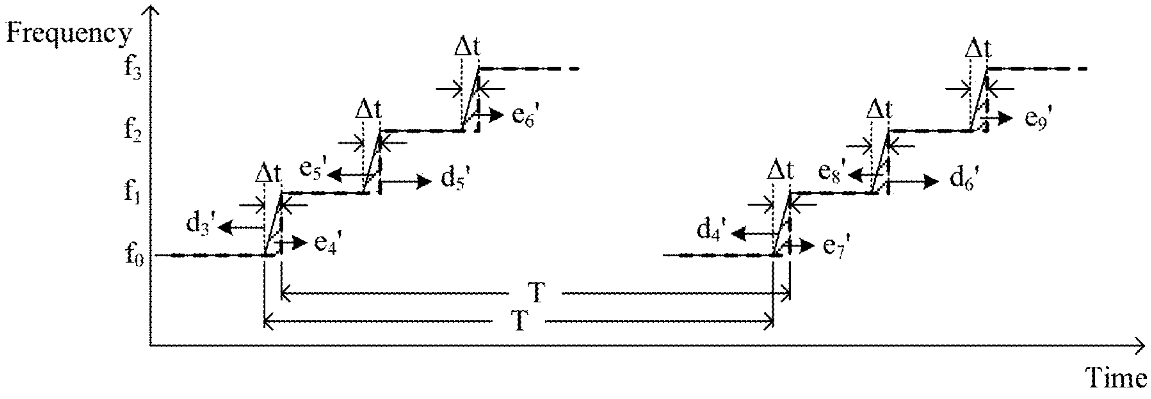
FIG. 9 is a schematic diagram of still another frequency shifting curve according to an embodiment of this application.

FIG. 9 is a schematic diagram of still another frequency shifting curve according to an embodiment of this application. FIG. 9 shows second frequency shifting curves $d_3'$ and $d_4'$ corresponding to two frequency shifting processes, and first frequency shifting curves $d_5'$ and $d_6'$ of two anchor nodes $b_1$ and $b_2$ corresponding to the two frequency shifting processes. A plurality of frequencies include four frequencies $f_0$ to $f_3$. When a frequency changes from one frequency to a next adjacent frequency in $d_3'$ to $d_6'$, a shape of the curve is a straight line that is not perpendicular to the horizontal axis, and a frequency interval between each two adjacent frequencies is $\Delta f$.

A same frequency in $d_3'$ and $d_5'$ has same durations and different start moments. In addition, in a time period in which a frequency is shifted from one frequency to a next frequency, shapes of $d_3'$ and $d_5'$ in the time period are different, that is, $d_3'$ and $d_5'$ cannot overlap. A same frequency in $d_4'$ and $d_6'$ has same durations and different start moments. In addition, in a time period in which a frequency is shifted from one frequency to a next frequency, shapes of $d_4'$ and $d_6'$ in the time period are different, that is, $d_4'$ and $d_6'$ cannot overlap.

703: The target node obtains, in the plurality of frequency shifting processes based on the signal, phase value groups respectively corresponding to the plurality of frequency shifting processes through measurement, where the phase value group includes phase values of the plurality of frequencies.

The plurality of frequencies include at least one target frequency, and a quantity of target frequencies may be less than or equal to a quantity of the plurality of frequencies. The target node may obtain, in a frequency shifting process based on the signal, a phase value of the target frequency corresponding to the frequency shifting process through measurement at a plurality of moments of a time period that the target frequency is in. In addition, in the frequency shifting process, a phase value of a non-target frequency corresponding to the frequency shifting process is obtained through measurement based on the signal at at least one moment of a time period that the non-target frequency is in.

It should be noted that for a plurality of anchor nodes (for example, the anchor nodes b1 and b2 shown in FIG. 3) in the localization system, the target node needs to obtain a phase value group through measurement in a frequency shifting process corresponding to each anchor node. For this process, refer to 303. Details are not described in this embodiment of this application.

704: The target node sends, to the processing device, the phase value groups respectively corresponding to the plurality of frequency shifting processes.

705: The processing device determines a location of the target node based on the phase value groups respectively corresponding to the plurality of frequency shifting processes.

It is assumed that an LO phase of any anchor node is $\varphi_A$, and the LO phase of the target node is $\varphi_T$. Based on a principle same as that in 303 in the first Embodiment, a phase value of a frequency $f_k$ obtained by the target node through measurement in a frequency shifting process corresponding to the any anchor node is:

$$\varphi_k = \varphi_A - \varphi_T - (Df_k/c) * 2\pi \bmod 2\pi + \varphi_{\Delta tk}$$

$\varphi_{\Delta k}$ is calculated as follows:

$$\varphi_{\Delta k} = \int_{t=t_0}^{t=t_k} [f_1(t) - f_2(t)f] \bullet dt$$

where $f_1(t)$ represents a first frequency shifting curve of the any anchor node, $f_2(t)$ represents a second frequency shifting curve corresponding to the frequency shifting process corresponding to the any anchor node, $t_0$ represents a start moment of the first frequency shifting curve or the second frequency shifting curve, and $t_k$ represents a moment at which the target node measures the phase value of the frequency $f_k$ in the frequency shifting process corresponding to the any anchor node.

For example, as shown in FIG. 8, a difference between a start moment of a second frequency shifting curve $d_3$ corresponding to a frequency shifting process of the anchor node $b_1$ and a start moment of a first frequency shifting curve $d_5$ of the anchor node $b_1$ is represented as Δt. A difference between a start moment of a second frequency shifting curve $d_4$ corresponding to a frequency shifting process of the anchor node $b_2$ and a start moment of a first frequency shifting curve do of the anchor node $b_2$ is represented as Δt. Because duration of a frequency in $d_3$ is the same as duration of the same frequency in $d_5$, a difference Δt between end moments of frequencies in $d_3$ and $d_5$ is the same. Because duration of a frequency in $d_4$ is the same as duration of the same frequency in $d_6$, a difference Δt between end moments of frequencies in $d_4$ and $d_6$ is the same. $\varphi_{\Delta tk}$ may be considered as an area of at least one region of regions $e_4$ to $e_6$ or an area of at least one region of regions $e_7$ to $e_9$ in FIG. 8, so $\varphi_{\Delta K}=2\pi k\Delta t\Delta f$. Therefore, a phase value $\varphi_{k1}$ of the frequency $f_k$ obtained by the target node through measurement in the frequency shifting process corresponding to the anchor node $b_1$ is:

$$\varphi_{k1} = \varphi_A - \varphi_T - (D_1 f_k/c) * 2\pi \bmod 2\pi + 2\pi k\Delta t\Delta f$$

A phase value $\varphi_{k2}$ of the frequency $f_k$ obtained by the target node through measurement in the frequency shifting process corresponding to the anchor node $b_2$ is:

$$\varphi_{k2} = \varphi_A - \varphi_T - (D_2 f_k/c) * 2\pi \bmod 2\pi + 2\pi k\Delta t\Delta f$$

As shown in FIG. 9, based on a principle same as that in FIG. 8, a difference Δt between end moments of frequencies in $d_3$' and $d_5$' is the same, and a difference Δt between end moments of frequencies in $d_4$' and $d_6$' is the same. Pak may be considered as an area of at least one region of regions $e_4$' to $e_6$' in FIG. 9, or an area of at least one region of regions $e_7$' to $e_9$' in FIG. 9, where $\varphi\Delta t_k=\pi k\Delta t\Delta f$. Therefore, the phase value $\varphi_{k1}$ of the frequency $f_k$ obtained by the target node through measurement in the frequency shifting process corresponding to the anchor node $b_1$ is:

$$\varphi_{k1} = \varphi_A - \varphi_T - (D_1 f_k/c) * 2\pi \bmod 2\pi + \pi k\Delta t\Delta f$$

A phase value $\varphi_{k2}$ of the frequency $f_k$ obtained by the target node through measurement in the frequency shifting process corresponding to the anchor node $b_2$ is:

$$\varphi_{k2} = \varphi_A - \varphi_T - (D_2 f_k/c) * 2\pi \bmod 2\pi + \pi k\Delta t\Delta f$$

For related descriptions of the curves $d_3$' to $d_6$' in FIG. 9, refer to FIG. 8. Details are not described herein in this embodiment of this application.

It can be learned from the foregoing analysis that when the second frequency shifting curve corresponding to each frequency shifting process and the first frequency shifting curve of the corresponding anchor node does not overlap in a same coordinate system, Pak may affect a distance D to be determined, so that a localization result is affected. It should be noted that, generally, a second frequency shifting curve corresponding to each frequency shifting process and a first frequency shifting curve of a corresponding anchor node cannot overlap in a same coordinate system. Therefore, impact of Ok on a localization result needs to be eliminated.

Optionally, φΔk in the phase value groups respectively corresponding to the plurality of frequency shifting processes may be the same, the plurality of frequency shifting processes form at least one frequency shifting process group, and the frequency shifting process group includes two frequency shifting processes. The processing device may perform difference processing on phase values of a same frequency corresponding to the two frequency shifting processes in the frequency shifting process group, to obtain a phase difference between a plurality of frequencies corresponding to the frequency shifting process group. In addition, a distance difference between two anchor nodes corresponding to the frequency shifting process group and the target node is obtained based on a phase difference between the plurality of frequencies corresponding to the frequency shifting process group. Next, the location of the target node is determined by using distance differences respectively corresponding to the at least one frequency shifting process group.

The processing device may perform difference calculation on the phase values of the same frequency corresponding to the two frequency shifting processes in the frequency shifting process group, to obtain the phase difference between the plurality of frequencies corresponding to the frequency shifting process group. Because values of $\varphi_{\Delta k}$ in the phase value groups respectively corresponding to the plurality of frequency shifting processes are the same, the difference calculation performed on the phase values of the same frequency corresponding to the two frequency shifting processes in the frequency shifting process group can eliminate the impact of $\varphi_{\Delta k}$ on the localization result.

After the phase difference between the plurality of frequencies corresponding to each frequency shifting process group is obtained, the difference between the distances between the two anchor nodes corresponding to the two frequency shifting processes in the frequency shifting process group and the target node may be determined based on a slope of a change in the phase difference between the plurality of frequencies corresponding to the frequency shifting process group with frequency. For this process, refer to the first embodiment. Details are not described herein in this embodiment of this application. For a process of determining the location of the target node through the difference between the distances between the two anchor nodes corresponding to the two frequency shifting processes in the frequency shifting process group and the target node, refer to the first embodiment. Details are not described herein in this embodiment of this application.

For example, two anchor nodes $b_1$ and $b_2$ shown in FIG. 7 are used as an example. LO phases of $b_1$ and $b_2$ are respectively $\varphi_{b1}$ and $\varphi_{b2}$, LO phases of the target node in a frequency shifting process corresponding to $b_1$ and a frequency shifting process corresponding to $b_2$ are respectively $\varphi_{T1}$ and $\varphi_{T2}$, and a phase value $\varphi_{k1}$ of a frequency $f_k$ measured by the target node in the frequency shifting process corresponding to $b_1$ is:

$$\varphi_{k1} = \varphi_{b1} - \varphi_{T1} - (D_1 f_k / c) * 2\pi \text{ mod } 2\pi + \phi_{\Delta k}$$

A phase value φk2 of the frequency $f_k$ obtained by the target node through measurement in the frequency shifting process corresponding to $b_2$ is:

$$\varphi_{k2} = \varphi_{b2} - \varphi_{T2} - (D_2 f_k / c) * 2\pi \text{ mod } 2\pi + \varphi_{\Delta k}$$

A difference $\Delta\varphi_k$ between the phase values of the same frequency $f_k$ that are measured by the target node in the two frequency shifting processes corresponding to $b_1$ and $b_2$ is:

$$\Delta\varphi_k = \varphi_{b1} - \varphi_{b2} - \varphi_{T1} + -\varphi_{T2} - (\Delta D f_k / c) * 2\pi \text{ mod } 2\pi$$

A slope of a change in $\Delta\varphi_k$ with frequency is $(\Delta D/c)*2\pi$ mod $2\pi$. After the slope of the change in $\Delta\varphi_k$ with frequency is obtained, $\Delta D$ can be obtained based on the slope.

In this embodiment of this application, the plurality of frequency shifting processes correspond to the second frequency shifting curves, so that an interval between start moments of second frequency shifting curves corresponding to any two frequency shifting processes of the target node is the same as an interval between start moments of first frequency shifting curves of two corresponding anchor nodes. In this way, Pak in phase values of a same frequency corresponding to the plurality of frequency shifting processes may be the same. When a plurality of anchor nodes have a same frequency shifting capability and a same frequency shifting manner, and clocks of the plurality of anchor nodes are synchronized, all the plurality of anchor nodes can perform frequency shifting based on second frequency shifting curves. In addition, when there is no clock offset between the plurality of anchor nodes and the target node, an interval between start moments of second frequency shifting curves corresponding to any two frequency shifting processes of the target node is the same as an interval between start moments of first frequency shifting curves of two corresponding anchor nodes. For a process of synchronizing clocks of the plurality of anchor nodes, a process of cable length compensation when cable lengths between the processing device and the anchor nodes are unequal, and a process of clock compensation when there is clock drift between the plurality of anchor nodes, refer to the process 305. Details are not described herein in this embodiment of this application.

When there is clock offset between the plurality of anchor nodes and the target node, an interval between start moments of second frequency shifting curves corresponding to any two frequency shifting processes is different from an interval between start moments of first frequency shifting curves of two corresponding anchor nodes. As a result, $\varphi_{\Delta k}$ in phase values of a same frequency corresponding to the plurality of frequency shifting processes is inconsistent. For a reason why there is clock offset between the target node and the anchor node, refer to the process 305. Details are not described in this embodiment of this application.

For example, it is assumed that start moments of a first frequency shifting curve of the anchor node $b_1$ and a second frequency shifting curve corresponding to the anchor node $b_1$ are both t=0, and a clock speed of the target node is high. When a start moment of a first frequency shifting curve of the anchor node $b_2$ is reached, because of clock drift, a start moment of a second frequency shifting curve corresponding to the anchor node $b_2$ is 0.99 T while the start moment of the first frequency shifting curve of the anchor node $b_2$ is T, with a difference of 0.01 T. When a start moment of a first frequency shifting curve of an anchor node $b_3$ is reached, because of clock drift, a start moment of a second frequency shifting curve corresponding to the anchor node $b_3$ is 0.98 T while the start moment of the first frequency shifting curve of the anchor node $b_3$ is T, with a difference of 0.02 T, and so on. It can be learned that an interval between start moments of second frequency shifting curves corresponding to any two frequency shifting processes is different from an interval between start moments of first frequency shifting curves of two corresponding anchor nodes. That is, Ok in phase values of a same frequency respectively corresponding to any two frequency shifting processes is different. In this case, the processing device may separately perform clock compensation on phase values in a phase value group corresponding to each frequency shifting process, to cancel inconsistency of $\varphi_{\Delta k}$ in phase values, caused by clock offset, of a same frequency respectively corresponding to the plurality of frequency shifting processes.

Optionally, a frequency offset may be determined based on a phase value group corresponding to a frequency shifting process, and clock compensation is separately performed, through the frequency offset, on the phase values in the phase value group corresponding to each frequency shifting process. Then, the location of the target node is determined based on the phase value group corresponding to the frequency shifting process obtained after clock compensation is performed. The plurality of frequencies include at least one target frequency, and a phase value of the target frequency is obtained through measurement by the target node at a plurality of moments in a time period that the target frequency is in. The processing device may determine, based on the phase value of the target frequency corresponding to the frequency shifting process, a frequency offset of the target node at the target frequency in the frequency shifting process. For a process of determining the frequency offset at the target frequency, refer to the process 306 in the foregoing first embodiment. Details are not described in this embodiment of this application.

When performing clock compensation, the processing device may determine a ratio of the frequency offset of the target node at the target frequency in the frequency shifting process to the target frequency, and then separately perform, based on a start moment of the second frequency shifting curve corresponding to a first frequency shifting process in the plurality of frequency shifting processes and the ratio, clock compensation on phase values in the phase value group corresponding to the frequency shifting process. An earliest start moment of the frequency shifting curves of the plurality of frequency shifting processes is a start moment of a frequency shifting curve of a frequency shifting process corresponding to a first anchor node in the plurality of anchor nodes.

For example, clock compensation is performed on a phase value $\varphi_{nk}$ of a frequency $f_{nk}$ corresponding to a frequency shifting process n corresponding to an nth anchor node. It is assumed that a start moment of $f_{nk}$ is $t_{nk}$, an earliest start moment of second frequency shifting curves respectively corresponding to the plurality of frequency shifting processes is $t_0'$ (a start moment of a frequency $f_0$ in the first frequency shifting process), a determined ratio is PPM, and a moment error caused by clock drift is $\Delta t''=\mathrm{PPM}\,(t_{nk}-t_0)$. A phase compensation value for clock compensation on $\varphi_{nk}$ is a sum of a product of $\Delta t''$, $2\pi$, and PPM and a phase compensation value of each frequency before $f_{nk}$. The formula is as follows: $2\pi\mathrm{PPM}\,[(f_{nk}-f_{n(k-1)})\,(t_{nk}-t_0')+(f_{n(k-1)}-f_{n(k-2)})\,(t_{nk}-t_0')+\ldots+(f_{n1}-f_{n0})\,(t_{n1}-t_0')]$.

For example, clock compensation is performed on a phase value $\varphi_{n3}$ of a frequency $f_{n3}$ corresponding to a frequency shifting process n. It is assumed that the determined ratio is 2 PPM, and a moment error caused by clock drift is $\Delta t''=2\,\mathrm{PPM}\,(t_{n3}-t_0')$. A phase compensation value for clock compensation performed on $\varphi_{n3}$ is $4\pi\mathrm{PPM}\,[(f_{n3}-f_{n2})\,(t_{n3}-t_0')+(f_{n2}-f_{n1})\,(t_{n2}-t_0')+(f_{n1}-f_{n0})\,(t_{n1}-t_0')]$, and the processing device may compensate the phase value of the frequency $f_{n3}$ of the frequency shifting process n to $\varphi_{n3}-4\pi\mathrm{PPM}\,[(f_{n3}-f_{n2})\,(t_{n3}-t_0')+(f_{n2}-f_{n1})\,(t_{n2}-t_0')+(f_{n1}-f_{n0})\,(t_{n1}-t_0')]$.

It should be noted that when the processing device synchronizes clocks of the plurality of anchor nodes through a unified external clock, a clock speed of each anchor node is irrelevant to a crystal oscillator (which determines an internal clock) of the anchor node. In this case, the anchor node may determine clock drift between the external clock and the internal clock, and send the clock drift between the external clock and the internal clock to the processing device. The processing device determines a clock drift rate difference (that is, the ratio of the frequency offset to the target frequency) between the internal clock and the external clock based on the clock drift between the external clock and the internal clock. The ratio, determined by the processing device, of the frequency offset of the target node at the target frequency in the frequency shifting process to the target frequency is a clock drift rate difference between a clock of the target node and an internal clock of an anchor node corresponding to the frequency shifting process. For each frequency shifting process, the processing device may determine a clock drift rate difference between the clock of the target node and an external clock of a corresponding anchor node based on a clock drift rate difference between the clock of the target node and an internal clock of the corresponding anchor node and a clock drift rate difference between the internal clock of the corresponding anchor node and the external clock of the corresponding anchor node. Then, for each frequency shifting process, clock compensation is separately performed on phase values in the phase value groups respectively corresponding to the plurality of frequency shifting processes based on the earliest start moment of a plurality of second frequency shifting curves respectively corresponding to the plurality of frequency shifting processes and a clock drift rate difference (which is a ratio) between the clock of the target node and the external clock of the corresponding anchor node.

In addition, the frequency offset may cause inconsistency of OAK in phase values of a same frequency respectively corresponding to the plurality of frequency shifting processes. In this case, the processing device may separately perform, based on the frequency offset of the target node at the target frequency in the frequency shifting process, frequency offset compensation on phase values in the phase value group corresponding to the frequency shifting process, to cancel inconsistency of $\varphi_{\Delta k}$ in phase values, caused by the frequency offset, of a same frequency respectively corresponding to the plurality of frequency shifting processes.

The phase value group corresponding to the frequency shifting process is obtained through measurement by the target node at a plurality of measurement moments. The processing device may determine a reference moment in the plurality of measurement moments in the frequency shifting process, and then separately perform, based on the reference moments in the frequency shifting process and the frequency offset of the target node at the target frequency, frequency offset compensation on the phase values in the phase value group corresponding to the frequency shifting process. For this process, refer to 305 in the first embodiment. Details are not described in this embodiment of this application. It should be noted that in the second embodiment, each frequency shifting moment corresponds to a reference moment, that is, different frequency shifting processes correspond to different reference moments.

The foregoing embodiment shows three compensation manners (including cable length compensation, clock compensation, and frequency offset compensation) for the phase value groups respectively corresponding to the plurality of frequency shifting processes. After the phase value groups respectively corresponding to the plurality of frequency shifting processes are obtained, the phase value groups respectively corresponding to the plurality of frequency shifting processes may be compensated in at least one manner of the foregoing three compensation manners.

In the second embodiment, localization of one target node is used as an example for description. When localizing a plurality of target nodes, each anchor node performs frequency shifting based on a first frequency shifting curve and sends a signal, and a plurality of target nodes separately perform frequency shifting based on a plurality of second frequency shifting curves corresponding to a plurality of frequency shifting processes and receive the signal, and perform the foregoing process. Details are not described herein in this embodiment of this application. It can be learned that in the second embodiment, a quantity of signal sending times required for localizing a plurality of target nodes is equal to a quantity of anchor nodes. When the quantity of anchor nodes in a localization system is less than a quantity of target nodes, the quantity of signal sending times can be further reduced.

In conclusion, according to the localization method provided in this embodiment of this application, each anchor node performs frequency shifting and sends a signal. Each target node performs, in each frequency shifting process in a plurality of frequency shifting processes, frequency shifting and receives the signal sent by the corresponding anchor node, and the plurality of frequency shifting processes correspond to a plurality of anchor nodes. Then, each target node obtains, in the plurality of frequency shifting processes based on signal through measurement, phase value groups respectively corresponding to the plurality of frequency shifting processes, and sends the phase value groups respectively corresponding to the plurality of frequency shifting processes to a processing device. The processing device determines a location of the target node based on the phase value groups respectively corresponding to the plurality of frequency shifting processes. A quantity of signal sending times required for localizing a plurality of target nodes is equal to a quantity of anchor nodes. When the quantity of anchor nodes in the localization system is less than the quantity of target nodes, the quantity of signal sending times can be further reduced, thereby reducing time consumption of a localization process, and improving localization efficiency and a refresh rate of the location of the target node. When the target node is in a moving state, accuracy of determining the location of the target node is high. In addition, power consumption of the target node is reduced, and a use time of the target node is increased. In addition, interference to another wireless device and interference caused by another wireless device are effectively reduced, and difficulty in scheduling performed by the target node for co-existence among different wireless technologies is reduced.

In addition, each anchor node performs the frequency shifting based on a first frequency shifting curve and continuously sends the signal. The target node performs the frequency shifting based on a corresponding second frequency shifting curve in each frequency shifting process and continuously receives the signal sent by the corresponding anchor node. The second frequency shifting curve corresponding to each frequency shifting process and the first frequency shifting curve of the corresponding anchor node usually cannot overlap, and the non-overlapping part may affect a phase value corresponding to the frequency shifting process, so that accuracy of localizing the target node is reduced. In this embodiment of this application, all the plurality of anchor nodes perform frequency shifting based on the first frequency shifting curves. The plurality of frequency shifting processes correspond to the second frequency shifting curves. An interval between start moments of second frequency shifting curves corresponding to any two frequency shifting processes is the same as an interval between start moments of first frequency shifting curves of two corresponding anchor nodes, so that areas of non-overlapping parts of the second frequency shifting curve corresponding to the plurality of frequency shifting processes and the first frequency shifting curve of the corresponding anchor node are the same. The areas of the non-overlapping parts may be canceled between the plurality of frequency shifting processes, to cancel impact of the non-overlapping parts on localization accuracy. This reduces the quantity of signal sending times, and eliminates impact of a difference on a localization result, thereby improving accuracy of the localization result.

In addition, in the localization process, only the anchor node needs to send a signal, and the target node does not need to send a signal, which helps protect privacy of the target node. The target node is usually a terminal device, which helps protect user data in the terminal device.

The foregoing mainly describes the localization method provided in the embodiments of this application from a perspective of interaction between devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 10:
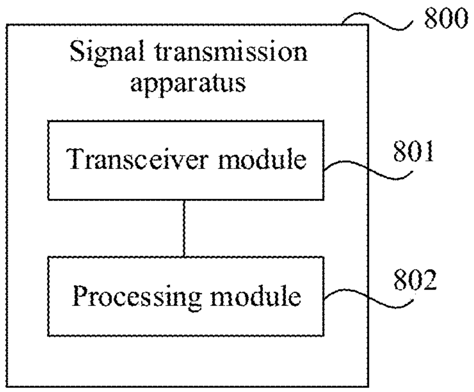
FIG. 10 is a block diagram of a localization apparatus according to an embodiment of this application.

FIG. 10 is a block diagram of a localization apparatus according to an embodiment of this application. When each functional module is obtained through division based on each corresponding function, the localization apparatus 800 may include a transceiver module 801 and a processing module 802. For example, the localization apparatus may be a processing device, an anchor node, or a target node, or may be a chip in the processing device, or may be another combined device, component, or the like that has a function of the localization apparatus. When the localization apparatus is a processing device, an anchor node, or a target node, the transceiver module 801 may be a transceiver, and the transceiver may include an antenna, a radio frequency circuit, and the like. The processing module 802 may be a processor (or a processing circuit), for example, a baseband processor, and the baseband processor may include one or more central processing units (CPUs). When the localization apparatus is a device or component that has the foregoing function, the transceiver module 801 may be a radio frequency unit, and the processing module 802 may be a processor (or a processing circuit), for example, a baseband processor. When the localization apparatus 800 is a chip system, the transceiver module 801 may be an input/output interface of a chip (for example, a baseband chip), and the processing module 802 may be a processor (or a processing circuit) of the chip system, and may include one or more central processing units. It should be understood that the transceiver module 801 in this embodiment of this application may be implemented by a transceiver or a transceiver-related circuit component; and the processing module 802 may be implemented by a processor or a processor-related circuit component (or referred to as a processing circuit).

For example, when the localization apparatus 800 is a processing device or a chip or a functional unit of a processing device, the transceiver module 801 may be configured to perform all receiving and sending operations performed by the processing device in the embodiment shown in FIG. 3 or FIG. 7, and/or configured to support another process of the technology described in this specification. The processing module 802 may be configured to perform all operations performed by the processing device in the embodiment shown in FIG. 3 or FIG. 7 except receiving and sending operations, and/or configured to support another process of the technology described in this specification.

The transceiver module 801 may include a sending module and/or a receiving module, which are respectively configured to perform sending and receiving operations performed by the processing device in the embodiment shown in FIG. 3 or FIG. 7. In an example, the localization apparatus includes:

a transceiver module, configured to obtain phase value groups respectively corresponding to a plurality of anchor nodes, where phase values corresponding to the plurality of anchor nodes are obtained through measurement after the plurality of anchor nodes perform frequency shifting and receive a signal sent by a target node while performing frequency shifting, and the phase value group includes phase values of a plurality of frequencies; and a processing module, configured to determine a location of the target node based on the phase value groups respectively corresponding to the plurality of anchor nodes.

With reference to the foregoing solution, the anchor node is configured to perform frequency shifting based on a first frequency shifting curve and continuously receive the signal, the target node is configured to perform frequency shifting based on a second frequency shifting curve and continuously send the signal, and start moments of first frequency shifting curves of the plurality of anchor nodes are the same.

With reference to the foregoing solution, the transceiver module is further configured to send synchronization information to the plurality of anchor nodes, where the synchronization information is used to synchronize clocks of the plurality of anchor nodes, and the plurality of anchor nodes are configured to perform, based on the synchronized clock, frequency shifting based on the first frequency shifting curves and continuously receive the signal.

With reference to the foregoing solution, the plurality of frequencies include at least one target frequency; and the processing module is specifically configured to: determine, based on a phase value of the target frequency corresponding to the anchor node, a frequency offset of the anchor node at the target frequency; separately perform, through the frequency offset of the anchor node at the target frequency, compensation on phase values in the phase value group corresponding to the anchor node; and determine the location of the target node based on the phase value groups respectively corresponding to the plurality of anchor nodes obtained after compensation is performed.

With reference to the foregoing solution, the phase value group corresponding to the anchor node is obtained through measurement by the anchor node at a plurality of measurement moments, and the processing module is specifically configured to: determine a reference moment in the plurality of measurement moments; and separately perform, based on the reference moment and the frequency offset of the anchor node at the target frequency, frequency offset compensation on the phase values in the phase value group corresponding to the anchor node.

With reference to the foregoing solution, the processing module is specifically configured to: determine a ratio of the frequency offset of the anchor node at the target frequency to the target frequency; and separately perform, based on the start moment of the first frequency shifting curve of the anchor node and the ratio, clock compensation on the phase values in the phase value group corresponding to the anchor node.

With reference to the foregoing solution, the plurality of anchor nodes form at least one anchor node group, the anchor node group includes two anchor nodes, and the processing module is specifically configured to: separately perform difference processing on phase values of a same frequency corresponding to the two anchor nodes in the anchor node group, to obtain a phase difference between the plurality of frequencies corresponding to the anchor node group; obtain, based on the phase difference between the plurality of frequencies corresponding to the anchor node group, a distance difference between the two anchor nodes in the anchor node group and the target node; and determine the location of the target node by using distance differences respectively corresponding to the at least one anchor node group.

With reference to the foregoing solution, the processing module is further configured to generate first curve information; the transceiver module is further configured to separately send the first curve information to the plurality of anchor nodes, where the first curve information is used by the plurality of anchor nodes to separately determine the first frequency shifting curves; the processing module is further configured to generate second curve information; the transceiver module is further configured to send the second curve information to the target node, where the second curve information is used by the target node to determine the second frequency shifting curve; the first curve information includes at least one of the following: the start moment of the first frequency shifting curve, the plurality of frequencies, an end moment of each frequency in the plurality of frequencies, a time period of each frequency in the plurality of frequencies, and duration of each frequency in the plurality of frequencies; and the second curve information includes at least one of the following: a start moment of the second frequency shifting curve, the plurality of frequencies, an end moment of each frequency in the plurality of frequencies, a time period of each frequency in the plurality of frequencies, and duration of each frequency in the plurality of frequencies.

In another example, the localization apparatus includes:

a transceiver module, configured to obtain phase value groups respectively corresponding to a plurality of frequency shifting processes of a target node, where the plurality of frequency shifting processes correspond to a plurality of anchor nodes, the phase value group corresponding to the frequency shifting process is obtained through measurement after the target node performs frequency shifting and receives a signal sent by a corresponding anchor node while performing frequency shifting, and the phase value group includes phase values of a plurality of frequencies; and a processing module, configured to determine a location of the target node based on the phase value groups respectively corresponding to the plurality of frequency shifting processes.

With reference to the foregoing solution, each frequency shifting process in the plurality of frequency shifting processes corresponds to one first frequency shifting curve, the target node is configured to perform the frequency shifting based on the corresponding first frequency shifting curve and continuously receive the signal sent by the corresponding anchor node in the frequency shifting process, and the anchor node is configured to perform the frequency shifting based on a second frequency shifting curve and continuously send the signal; and an interval between start moments of first frequency shifting curves corresponding to any two frequency shifting processes of the target node is the same as an interval between start moments of second frequency shifting curves of two anchor nodes corresponding to the any two frequency shifting processes.

With reference to the foregoing solution, the transceiver module is further configured to send synchronization information to the plurality of anchor nodes, where the synchronization information is used to synchronize clocks of the plurality of anchor nodes, and the plurality of anchor nodes are configured to perform, based on the synchronized clock, the frequency shifting based on the second frequency shifting curves and continuously send the signal.

With reference to the foregoing solution, the plurality of frequencies include at least one target frequency; and the processing module is specifically configured to: determine, based on a phase value of the target frequency corresponding to the frequency shifting process, a frequency offset of the target node at the target frequency in the frequency shifting process; separately perform, through the frequency offset of the target node at the target frequency in the frequency shifting process, compensation on phase values in the phase value group corresponding to the frequency shifting process; and determine the location of the target node based on the phase value group corresponding to the frequency shifting process obtained after compensation is performed.

With reference to the foregoing solution, the phase value group corresponding to the frequency shifting process is obtained through measurement by the target node at a plurality of measurement moments, and the processing module is specifically configured to: determine a reference moment in the plurality of measurement moments in the frequency shifting process; and separately perform, based on the reference moment in the frequency shifting process and the frequency offset of the target node at the target frequency, frequency offset compensation on the phase values in the phase value group corresponding to the frequency shifting process.

With reference to the foregoing solution, the processing module is specifically configured to: determine a ratio of the frequency offset of the target node at the target frequency in the frequency shifting process to the target frequency; and separately perform, based on the start moment of the first frequency shifting curve corresponding to a first frequency shifting process in the plurality of frequency shifting processes and the ratio, clock compensation on the phase values in the phase value group corresponding to the frequency shifting process.

With reference to the foregoing solution, the plurality of frequency shifting processes form at least one frequency shifting process group, the frequency shifting process group includes two frequency shifting processes, and the processing module is specifically configured to: separately perform difference processing on phase values of a same frequency corresponding to the two frequency shifting processes in the frequency shifting process group, to obtain a phase difference between the plurality of frequencies corresponding to the frequency shifting process group; obtain, based on the phase difference between the plurality of frequencies corresponding to the frequency shifting process group, a distance difference between two anchor nodes corresponding to the frequency shifting process group and the target node; and determine the location of the target node by using distance differences respectively corresponding to the at least one frequency shifting process group.

With reference to the foregoing solution, the processing module is further configured to generate first curve information and second curve information of each frequency shifting process in the plurality of frequency shifting processes; the transceiver module is further configured to send the first curve information and the second curve information of each frequency shifting process in the plurality of frequency shifting processes to the target node, where the first curve information and the second curve information are used by the target node to determine the first frequency shifting curves respectively corresponding to the plurality of frequency shifting processes; the processing module is further configured to generate third curve information; the transceiver module is further configured to separately send the third curve information to the plurality of anchor nodes, where the third curve information is used by the plurality of anchor nodes to separately determine the second frequency shifting curves; the first curve information includes at least one of the following: a start moment of the first frequency shifting curve corresponding to each frequency shifting process in the plurality of frequency shifting processes, the start moment of the first frequency shifting curve corresponding to the first frequency shifting process in the plurality of frequency shifting processes, and an interval between start moments of first frequency shifting curves corresponding to each two adjacent frequency shifting processes; the second curve information includes at least one of the following: the plurality of frequencies, an end moment of each frequency in the plurality of frequencies, a time period of each frequency in the plurality of frequencies, and duration of each frequency in the plurality of frequencies; and the third curve information includes at least one of the following: a start moment of the second frequency shifting curve, the plurality of frequencies, an end moment of each frequency in the plurality of frequencies, a time period of each frequency in the plurality of frequencies, and duration of each frequency in the plurality of frequencies.

For example, when the localization apparatus 800 is an anchor node or a chip or a functional unit of an anchor node, the transceiver module 801 may be configured to perform all receiving and sending operations performed by the anchor node in the embodiment shown in FIG. 3 or FIG. 7, and/or configured to support another process of the technology described in this specification. The processing module 802 may be configured to perform all operations performed by the anchor node in the embodiment shown in FIG. 3 or FIG. 7 except receiving and sending operations, and/or configured to support another process of the technology described in this specification.

The transceiver module 801 may include a sending module and/or a receiving module, which are respectively configured to perform sending and receiving operations performed by the anchor node in the embodiment shown in FIG. 3 or FIG. 7. In an example, the localization apparatus includes:

- a transceiver module, configured to perform frequency shifting and receive a signal sent by a target node while performing frequency shifting; and
- a processing module, configured to obtain, based on the signal, phase values of a plurality of frequencies through measurement; and
- the transceiver module is further configured to send the phase values of the plurality of frequencies to a processing device, where the phase values of the plurality of frequencies are used by the processing device to determine a location of the target node.

With reference to the foregoing solution, the transceiver module is specifically configured to perform the frequency shifting based on a first frequency shifting curve and continuously receiving the signal, where the signal is continuously sent by the target node while performing the frequency shifting based on a second frequency shifting curve.

With reference to the foregoing solution, the processing module is further configured to: determine curve information, where the curve information includes at least one of the following: a start moment of the first frequency shifting curve, the plurality of frequencies, an end moment of each frequency, a time period of each frequency, and duration of each frequency; and determine the first frequency shifting curve based on the curve information.

With reference to the foregoing solution, the curve information includes the start moment of the first frequency shifting curve, and the processing module is specifically configured to: receive indication information sent by the target node, where the indication information indicates a duration interval; and determine the start moment of the first frequency shifting curve based on a moment at which the indication information is received and the duration interval.

With reference to the foregoing solution, the plurality of frequencies include at least one target frequency, and the processing module is specifically configured to: obtain, based on the signal, a phase value of the target frequency through measurement at a plurality of moments of a time period that the target frequency is in; and obtain, based on the signal, a phase value of a non-target frequency through measurement at at least one moment of a time period that the non-target frequency is in.

In another example, the localization apparatus includes:

- a transceiver module, configured to perform frequency shifting and send a signal, where the signal is received by a target node while performing frequency shifting in a corresponding frequency shifting process in a plurality of frequency shifting processes, the target node is configured to obtain, based on the signal, phase values of a plurality of frequencies corresponding to the frequency shifting process through measurement, and the phase values of the plurality of frequencies corresponding to the frequency shifting process are used by a processing device to determine a location of the target node.

With reference to the foregoing solution, the transceiver module is specifically configured to perform the frequency shifting based on a first frequency shifting curve and continuously sending the signal, where the target node is configured to perform the frequency shifting based on a corresponding second frequency shifting curve and continuously receive the signal in the corresponding frequency shifting process.

With reference to the foregoing solution, the localization apparatus includes:

- a processing module, configured to: determine first curve information, where the first curve information includes at least one of the following: a start moment of the first frequency shifting curve, the plurality of frequencies, an end moment of each frequency in the plurality of frequencies, a time period of each frequency in the plurality of frequencies, and duration of each frequency in the plurality of frequencies; and determine the first frequency shifting curve based on the first curve information.

With reference to the foregoing solution, the transceiver module is further configured to send indication information to the target node, where the indication information indicates a duration interval, the duration interval is used by the target node to determine second curve information and third curve information of each frequency shifting process in the plurality of frequency shifting processes, and the second curve information and the third curve information is used by the target node to determine second frequency shifting curves respectively corresponding to the plurality of frequency shifting processes; the second curve information includes at least one of the following: a start moment of a second frequency shifting curve corresponding to each frequency shifting process in the plurality of frequency shifting processes, a start moment of a second frequency shifting curve corresponding to a first frequency shifting process in the plurality of frequency shifting processes, and an interval between start moments of second frequency shifting curves corresponding to each two adjacent frequency shifting processes; the third curve information includes at least one of the following: the plurality of frequencies, an end moment of each frequency in the plurality of frequencies, a time period of each frequency in the plurality of frequencies, and duration of each frequency in the plurality of frequencies.

For example, when the localization apparatus 800 is a target node or a chip or a functional unit of a target node, the transceiver module 801 may be configured to perform all receiving and sending operations performed by the target node in the embodiment shown in FIG. 3 or FIG. 7, and/or configured to support another process of the technology described in this specification. The processing module 802 may be configured to perform all operations performed by the target node in the embodiment shown in FIG. 3 or FIG. 7 except receiving and sending operations, and/or configured to support another process of the technology described in this specification.

The transceiver module 801 may include a sending module and/or a receiving module, which are respectively configured to perform sending and receiving operations performed by the target node in the embodiment shown in FIG. 3 or FIG. 7. In an example, the localization apparatus includes:

- a transceiver module, configured to perform frequency shifting and send a signal, where the signal is separately received by a plurality of anchor nodes while performing frequency shifting, the plurality of anchor nodes are configured to separately obtain corresponding phase value groups through measurement based on the signal, the phase value groups respectively corresponding to the plurality of anchor nodes are used by a processing device to determine a location of a target node, and the phase value group includes a plurality of phase values.

With reference to the foregoing solution, the transceiver module is specifically configured to perform the frequency shifting based on a first frequency shifting curve and continuously sending the signal, where the signal is continuously received by the plurality of the anchor nodes separately while performing the frequency shifting based on second frequency shifting curves.

With reference to the foregoing solution, the localization apparatus includes:

a processing module, configured to: determine first curve information, where the first curve information includes at least one of the following: a start moment of the first frequency shifting curve, a plurality of frequencies, an end moment of each frequency in the plurality of frequencies, a time period of each frequency in the plurality of frequencies, and duration of each frequency in the plurality of frequencies; and determine the first frequency shifting curve based on the first curve information.

With reference to the foregoing solution, the transceiver module is further configured to separately send indication information to the plurality of anchor nodes, where the indication information indicates a duration interval, the duration interval is used by the plurality of anchor nodes to separately determine second curve information, and the second curve information is used by the plurality of anchor nodes to separately determine the second frequency shifting curves; and the second curve information includes at least one of the following: a start moment of the second frequency shifting curve, the plurality of frequencies, an end moment of each frequency, a time period of each frequency, and duration of each frequency.

In another example, the localization apparatus includes:

a transceiver module, configured to perform, in each frequency shifting process in a plurality of frequency shifting processes, frequency shifting and receive a signal sent by a corresponding anchor node while performing frequency shifting; and a processing module, configured to obtain, based on the signal in the plurality of frequency shifting processes through measurement, phase value groups respectively corresponding to the plurality of frequency shifting processes, where the phase value group includes phase values of a plurality of frequencies; and the transceiver module is further configured to send, to a processing device, the phase value groups respectively corresponding to the plurality of frequency shifting processes, where the phase value groups respectively corresponding to the plurality of frequency shifting processes are used by the processing device to determine a location of a target node.

With reference to the foregoing solution, the transceiver module is specifically configured to perform, in the frequency shifting process, the frequency shifting based on a first frequency shifting curve corresponding to the frequency shifting process and continuously receive the signal, where the signal is continuously sent by the anchor node corresponding to the frequency shifting process while performing the frequency shifting based on a second frequency shifting curve.

With reference to the foregoing solution, the processing module is further configured to determine first curve information, where the first curve information includes at least one of the following: a start moment of the first frequency shifting curve corresponding to each frequency shifting process in the plurality of frequency shifting processes, a start moment of the first frequency shifting curve corresponding to a first frequency shifting process in the plurality of frequency shifting processes, and an interval between start moments of first frequency shifting curves corresponding to each two adjacent frequency shifting processes; determine second curve information of each frequency shifting process in the plurality of frequency shifting processes, where the second curve information includes at least one of the following: the plurality of frequencies, an end moment of each frequency in the plurality of frequencies, a time period of each frequency in the plurality of frequencies, and duration of each frequency in the plurality of frequencies; and determine, based on the first curve information and the second curve information of each frequency shifting process in the plurality of frequency shifting processes, the first frequency shifting curves respectively corresponding to the plurality of frequency shifting processes.

With reference to the foregoing solution, the first curve information includes the start moment of the first frequency shifting curve corresponding to the first frequency shifting process, and the processing module is specifically configured to: receive indication information sent by the anchor node, where the indication information indicates a duration interval; and determine, based on a moment at which the indication information is received and the duration interval, the start moment of the first frequency shifting curve corresponding to the first frequency shifting process.

With reference to the foregoing solution, the plurality of frequencies include at least one target frequency, and the processing module is specifically configured to: obtain, in the frequency shifting process based on the signal, a phase value of the target frequency corresponding to the frequency shifting process through measurement at a plurality of moments of a time period that the target frequency is in; and obtain, in the frequency shifting process based on the signal, a phase value of the non-target frequency corresponding to the frequency shifting process through measurement at at least one moment of a time period that a non-target frequency is in.

Figure 11:
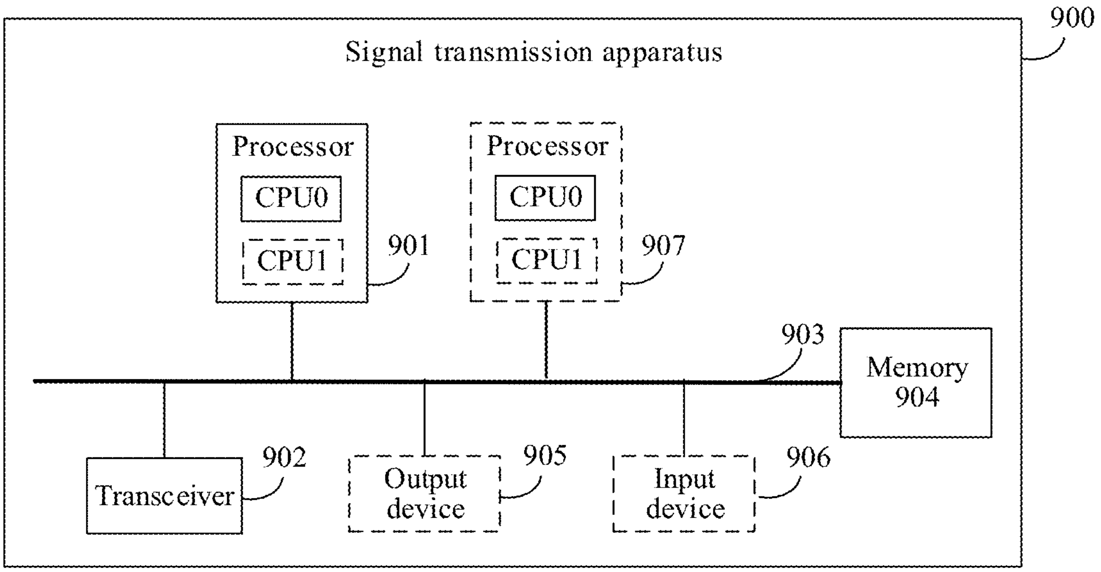
FIG. 11 is a schematic diagram of a structure of an electronic device according to an embodiment of this application.

FIG. 11 is a schematic diagram of a structure of an electronic device according to an embodiment of this application. The electronic device 900 may be a processing device or a chip or a functional module in a processing device, or may be an anchor node or a chip or a functional module in an anchor node, or may be a target node or a chip or a functional module in a target node. As shown in FIG. 11, the electronic device 900 includes a processor 901, a transceiver 902, and a communication line 903.

The processor 901 is configured to perform any step performed by the processing device, the anchor node, or the target node in the method embodiments shown in FIG. 3 and FIG. 7, and when performing data transmission such as obtaining, may choose to invoke the transceiver 902 and the communication line 903 to implement a corresponding operation.

Further, the electronic device 900 may further include a memory 904. The processor 901, the memory 904, and the transceiver 902 may be connected to each other through the communication line 903.

The processor 901 is a CPU, a general-purpose processor network processor (NP), a digital signal processor (DSP), a microprocessor, a microcontroller, a programmable logic device (PLD), or any combination thereof. Alternatively, the processor 801 may be another apparatus having a processing function, for example, a circuit, a device, or a software module. This is not limited.

The transceiver 902 is configured to communicate with another device or another communication network. The another communication network may be Ethernet, a radio access network (RAN), a wireless local area network (WLAN), or the like. The transceiver 902 may be a module, a circuit, a transceiver, or any apparatus that can implement communication.

The transceiver 902 is mainly configured to receive and send data, and may include a transmitter and a receiver, which separately send and receive data. Operations other than data receiving and sending are implemented by the processor, for example, information processing and calculation.

The communication line 903 is configured to transmit information between components included in the electronic device 900.

In a design, the processor may be considered as a logic circuit, and the transceiver may be considered as an interface circuit.

The memory 904 is configured to store instructions. The instructions may be a computer program.

The memory 904 may be a volatile memory or a non-volatile memory, or may include both of a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). The memory 904 may alternatively be a compact disc read-only memory (CD-ROM) or another optical disc memory, an optical disc storage (including a compact disc, a laser disc, an optical disc, a digital versatile disc, a Blu-ray disc, or the like), a magnetic disk storage medium, another magnetic storage device, or the like. It should be noted that the memory of the systems and methods described in this specification includes but is not limited to these and any memory of another proper type.

It should be noted that the memory 904 may exist independently of the processor 901, or may be integrated with the processor 901. The memory 904 may be configured to store instructions, program code, data, or the like. The memory 904 may be located inside the electronic device 900, or may be located outside the electronic device 900. This is not limited. The processor 901 is configured to execute the instructions stored in the memory 904, to implement the method provided in the foregoing embodiments of this application.

In an example, the processor 901 may include one or more CPUs, for example, CPU0 and CPU1 in FIG. 11.

In an optional implementation, the electronic device 900 includes a plurality of processors. For example, in addition to the processor 901 in FIG. 11, the electronic device 900 may further include a processor 907.

In an optional implementation, the electronic device 900 further includes an output device 905 and an input device 906. For example, the input device 906 is a device, for example, a keyboard, a mouse, a microphone, or a joystick, and the output device 905 is device, for example, a display or a speaker.

It should be noted that the electronic device 900 may be a terminal device, a network device, a relay device, an embedded device, a chip system, or a device having a structure similar to that in FIG. 11. In addition, a composition structure shown in FIG. 11 does not constitute a limitation on the electronic device 900. In addition to the components shown in FIG. 11, the electronic device 900 may include more or fewer components than those shown in FIG. 11, or combine some components, or have different component arrangements.

The processor and the transceiver described in this application may be implemented on an integrated circuit (IC), an analog IC, a radio frequency integrated circuit RFIC, a hybrid signal IC, an application specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

It should be noted that the electronic device 900 may be any type of handheld or fixed device, for example, a notebook or laptop computer, a mobile phone, a smartphone, a tablet or tablet computer, a camera, a desktop computer, a set-top box, a television, a display device, a digital media player, a video game console, a video streaming device (for example, a content service server or a content distribution server), a broadcast receiving device, a broadcast transmitting device, and a monitoring device, and may not use or use any type of operating system. The electronic device 900 may alternatively be a device in a cloud computing scenario, for example, a virtual machine in the cloud computing scenario. In some cases, the electronic device 900 may be equipped with components for wireless communication. Therefore, the electronic device 900 may be a wireless communication device, or a device having a structure similar to that in FIG. 11. In addition, a composition structure shown in FIG. 11 does not constitute a limitation on the electronic device 900. In addition to the components shown in FIG. 11, the electronic device 900 may include more or fewer components than those shown in FIG. 11, or combine some components, or have different component arrangements.

Alternatively, the electronic device 900 may be a chip system. The chip system may include a chip, or may include a chip and another discrete device. In addition, for actions, terms, and the like in embodiments of this application, refer to each other. This is not limited. In embodiments of this application, names of messages exchanged between devices, names of parameters in the messages, or the like are merely examples. Other names may alternatively be used during a specific implementation. This is not limited.

In still another possible implementation, the transceiver module 801 in FIG. 10 may be replaced with the transceiver 902 in FIG. 11, and a function of the transceiver module 801 may be integrated into the transceiver 902. The processing module 802 may be replaced with the processor 907, and a function of the processing module 802 may be integrated into the processor 907. Further, the localization apparatus 800 shown in FIG. 10 may further include a memory (not shown in the figure). When the transceiver module 801 is replaced with a transceiver, and the processing module 802 is replaced with a processor, the localization apparatus 800 in this embodiment of this application may be the electronic device 900 shown in FIG. 11.

Figure 12:
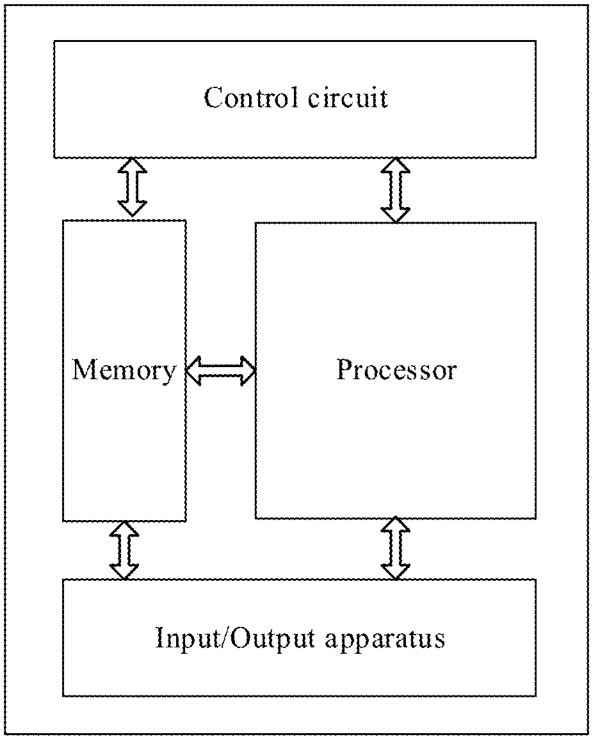
FIG. 12 is a schematic diagram of a structure of another localization apparatus according to an embodiment of this application.

FIG. 12 is a schematic diagram of a structure of another localization apparatus according to an embodiment of this application. The localization apparatus is applicable to a scenario shown in the foregoing method embodiments. For ease of description, FIG. 12 shows only main components of the localization apparatus, including a processor, a memory, a control circuit, and an input/output apparatus. The processor is mainly configured to: process a communication protocol and communication data, execute a software program, and process data of the software program. The memory is mainly configured to store the software program and data. The control circuit is mainly configured to supply power and transmit various electrical signals. The input/output apparatus is mainly configured to receive data input by a user and output data to the user.

When the localization apparatus is a processing device, an anchor node, or a target node, the control circuit is a main board, the memory includes a medium having a storage function, for example, a hard disk, a RAM, or a ROM, and the processor may include a baseband processor and a central processing unit. The baseband processor is mainly configured to process a communication protocol and communication data. The central processing unit is mainly configured to control an entire network device, execute a software program, and process data of the software program. The input/output apparatus includes a display screen, a keyboard, a mouse, and the like. The control circuit may further include or be connected to a transceiver circuit or a transceiver, for example, a network cable interface, and is configured to send or receive data or a signal, for example, perform data transmission and communication with another device. Further, the apparatus may further include an antenna, configured to receive and send a wireless signal, and configured to perform data/signal transmission with another device.

According to the methods provided in embodiments of this application, this application further provides a computer program product. The computer program product includes computer program code. When the computer program code is run on a computer, the computer is enabled to perform the method according to any one of the embodiments of this application.

Embodiments of this application further provide a computer-readable storage medium. All or some of the processes in the foregoing method embodiments may be implemented by a computer or an apparatus having an information processing capability executing a computer program or instructions to control related hardware to complete. The computer program or a group of instructions may be stored in the foregoing computer-readable storage medium. When the computer program or the group of instructions is executed, the processes in the foregoing method embodiments may be performed. The computer-readable storage medium may be an internal storage unit of the terminal device (including a data transmit end and/or a data receive end) in any one of the foregoing embodiments, for example, a hard disk or a memory of the terminal device. The computer-readable storage medium may alternatively be an external storage device of the terminal device, for example, a plug-in hard disk, a smart media card (SMC), a secure digital (SD) card, or a flash memory card (flash card) that is equipped on the terminal device. Further, the computer-readable storage medium may alternatively include both of the internal storage unit of the terminal device and the external storage device. The computer-readable storage medium is configured to store the computer program or instructions, and other programs and data required by the terminal device. The computer-readable storage medium may be further configured to temporarily store data that has been output or is to be output.

A person of ordinary skill in the art may recognize that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to the conventional technology, or a part of the technical solutions may be implemented in a form of a software product. The computer software product is stored in a storage medium, and includes several instructions for instructing a computer device (for example, a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A localization method, wherein the method comprises:

obtaining a plurality of phase value groups respectively corresponding to a plurality of anchor nodes, wherein a plurality of phase values corresponding to the plurality of anchor nodes are obtained through measurement after the plurality of anchor nodes perform frequency shifting based on a plurality of first frequency shifting curves and receive a signal, wherein the signal is sent by a target node while performing frequency shifting based on a second frequency shifting curve, and wherein each phase value group of the plurality of phase value groups comprises a plurality of phase values of a plurality of frequencies; and determining a location of the target node based on the plurality of phase value groups respectively corresponding to the plurality of anchor nodes.

2. The method according to claim 1, wherein an anchor node of the plurality of anchor nodes is configured to perform frequency shifting based on a corresponding first frequency shifting curve and continuously receive the signal, wherein the target node is configured to perform frequency shifting based on the second frequency shifting curve and continuously send the signal, and wherein a plurality of start moments of the plurality of first frequency shifting curves of the plurality of anchor nodes are the same.

3. The method according to claim 2, wherein the method further comprises:

sending synchronization information to the plurality of anchor nodes, wherein the synchronization information is used to synchronize a plurality of clocks of the plurality of anchor nodes, and wherein the plurality of anchor nodes are configured to perform, based on the plurality of synchronized clocks, frequency shifting based on the plurality of first frequency shifting curves and continuously receive the signal.

4. The method according to claim 2, wherein the plurality of frequencies comprise at least one target frequency, and wherein the determining a location of the target node based on the plurality of phase value groups respectively corresponding to the plurality of anchor nodes comprises:

for each anchor node of the plurality of anchor nodes:

determining, based on a phase value of a target frequency corresponding to the anchor node, a frequency offset of the anchor node at the target frequency; and separately performing, through the frequency offset of the anchor node at the target frequency, compensation on a plurality of phase values in a phase value group corresponding to the anchor node; and determining the location of the target node based on the plurality of phase value groups respectively corresponding to the plurality of anchor nodes obtained after compensation is performed for each anchor node of the plurality of anchor nodes.

5. The method according to claim 4, wherein the phase value group corresponding to the anchor node is obtained through measurement by the anchor node at a plurality of measurement moments, and wherein the separately performing, through the frequency offset of the anchor node at the target frequency, compensation on the plurality of phase values in a phase value group corresponding to the anchor node comprises:

determining a reference moment in the plurality of measurement moments; and separately performing, based on the reference moment and the frequency offset of the anchor node at the target frequency, frequency offset compensation on the plurality of phase values in the phase value group corresponding to the anchor node.

6. The method according to claim 4, wherein the separately performing, through the frequency offset of the anchor node at the target frequency, compensation on the plurality of phase values in a phase value group corresponding to the anchor node comprises:

determining a ratio of the frequency offset of the anchor node at the target frequency to the target frequency; and separately performing, based on start moment of the first frequency shifting curve of the anchor node and the ratio, clock compensation on the plurality of phase values in the phase value group corresponding to the anchor node.

7. The method according to claim 2, wherein the plurality of anchor nodes form at least one anchor node group, wherein an anchor node group comprises two anchor nodes, and wherein the determining a location of the target node based on the plurality of phase value groups respectively corresponding to the plurality of anchor nodes comprises:

for each anchor node group of the at least one anchor node group:

separately performing difference processing on a plurality of phase values of a same frequency corresponding to the two anchor nodes in the anchor node group to obtain a phase difference among a plurality of frequencies corresponding to the anchor node group; and obtaining, based on the phase difference among the plurality of frequencies corresponding to the anchor node group, a distance difference between the two anchor nodes in the anchor node group and the target node; and determining the location of the target node by using at least one distance difference respectively corresponding to the at least one anchor node group.

8. The method according to claim 2, wherein the method further comprises:

generating and separately sending first curve information to the plurality of anchor nodes, wherein the first curve information is used by the plurality of anchor nodes to separately determine the plurality of first frequency shifting curves; and generating and sending second curve information to the target node, wherein the second curve information is used by the target node to determine the second frequency shifting curve;

wherein the first curve information comprises at least one of the start moments of the plurality of first frequency shifting curves, the plurality of frequencies, an end moment of each frequency in the plurality of frequencies, a time period of each frequency in the plurality of frequencies, or duration of each frequency in the plurality of frequencies; and wherein the second curve information comprises at least one of a start moment of the second frequency shifting curve, the plurality of frequencies, the end moment of each frequency in the plurality of frequencies, the time period of each frequency in the plurality of frequencies, or the duration of each frequency in the plurality of frequencies.

9. A localization method, wherein the method comprises:

performing frequency shifting based on a first frequency shifting curve and receiving a signal sent by a target node while performing frequency shifting based on a second frequency shifting curve;

obtaining, based on the signal, a plurality of phase values of a plurality of frequencies through measurement; and sending the plurality of phase values of the plurality of frequencies to a processing device, wherein the plurality of phase values of the plurality of frequencies are used by the processing device to determine a location of the target node.

10. The method according to claim 9, wherein the receiving a signal sent by a target node while performing frequency shifting comprises:

continuously receiving the signal, wherein the signal is continuously sent by the target node while performing the frequency shifting based on the second frequency shifting curve.

11. The method according to claim 10, wherein the method further comprises:

determining curve information, wherein the curve information comprises at least one of a start moment of the first frequency shifting curve, the plurality of frequencies, an end moment of each frequency, a time period of each frequency, or duration of each frequency; and determining the first frequency shifting curve based on the curve information.

12. The method according to claim 11, wherein the curve information comprises the start moment of the first frequency shifting curve, and wherein the determining curve information comprises:

receiving indication information sent by the target node, wherein the indication information indicates a duration interval; and determining the start moment of the first frequency shifting curve based on a moment at which the indication information is received and the duration interval.

13. The method according to claim 9, wherein the plurality of frequencies comprise at least one target frequency, and wherein the obtaining, based on the signal, a plurality of phase values of a plurality of frequencies through measurement comprises:

obtaining, based on measurement of the signal at a plurality of moments of a first time period, a phase value of the target frequency, wherein the first time period is a time period that the signal is at the target frequency; and obtaining, based on measurement of the signal at at least one moment of a second time period, a phase value of a non-target frequency, wherein the second time period is a time period that the signal is at the non-target frequency.

14. A localization method, wherein the method comprises:

performing frequency shifting based on a first frequency shifting curve and sending a signal, wherein the signal is separately received by a plurality of anchor nodes while performing frequency shifting based on a plurality of second frequency shifting curves, wherein the plurality of anchor nodes are configured to separately obtain a plurality of corresponding phase value groups through measurement based on the signal, wherein the plurality of phase value groups respectively corresponding to the plurality of anchor nodes are used by a processing device to determine a location of a target node, and wherein a phase value group comprises a plurality of phase values.

15. The method according to claim 14, wherein the sending a signal comprises:

continuously sending the signal, wherein the signal is continuously received by the plurality of the anchor nodes separately while performing the frequency shifting based on the plurality of second frequency shifting curves.

16. The method according to claim 15, wherein the method further comprises:

determining first curve information, wherein the first curve information comprises at least one of a start moment of the first frequency shifting curve, a plurality of frequencies, an end moment of each frequency in the plurality of frequencies, a time period of each frequency in the plurality of frequencies, or duration of each frequency in the plurality of frequencies; and determining the first frequency shifting curve based on the first curve information.

17. The method according to claim 15, wherein the method further comprises:

separately sending indication information to the plurality of anchor nodes, wherein the indication information indicates a duration interval, wherein the duration interval is used by the plurality of anchor nodes to separately determine second curve information, and wherein the second curve information is used by the plurality of anchor nodes to separately determine the plurality of second frequency shifting curves; and wherein the second curve information comprises at least one of a start moment of the second frequency shifting curve, a plurality of frequencies, an end moment of each frequency in the plurality of frequencies, a time period of each frequency in the plurality of frequencies, or duration of each frequency in the plurality of frequencies.

18. The method according to claim 1, wherein a start moment of a first frequency shifting curve is determined by a corresponding anchor node.

19. The method according to claim 9, comprising determining a start moment of the first frequency shifting curve.

20. The method according to claim 14, wherein a start moment of a first frequency shifting curve is determined by a corresponding anchor node.

* * * * *